United States Patent
Murrett et al.

(10) Patent No.: US 10,268,748 B2
(45) Date of Patent: Apr. 23, 2019

(54) READER APPLICATION WITH A PERSONALIZED FEED AND METHOD OF PROVIDING RECOMMENDATIONS WHILE MAINTAINING USER PRIVACY

(71) Applicant: Apple Inc., Cupertino, CA (US)

(72) Inventors: Martin J. Murrett, Portland, OR (US); Ian J. Elseth, Vancouver, WA (US); Guillermo Ortiz, Cupertino, CA (US); Ravi Chandra Jammalamadaka, Santa Clara, CA (US); Dominic J. Hughes, Cupertino, CA (US); Steve E. Marmon, Mountain View, CA (US); Casey M. Dougherty, San Francisco, CA (US); Gregory C. Langmead, Pittsburgh, PA (US); Mark A. Gingrich, San Jose, CA (US); Donald R. Beaver, Pittsburgh, PA (US); Amogh Mahapatra, Santa Clara, CA (US); Collin D. Ruffenach, Portland, OR (US); Georgios Sofianatos, Cupertino, CA (US); Justin W. Sung, Cupertino, CA (US); Kang Tu, Cupertino, CA (US); Jason A. Novak, Cupertino, CA (US)

(73) Assignee: APPLE INC., Cupertino, CA (US)

(*) Notice: Subject to any disclaimer, the term of this patent is extended or adjusted under 35 U.S.C. 154(b) by 416 days.

(21) Appl. No.: 14/871,489

(22) Filed: Sep. 30, 2015

(65) Prior Publication Data

US 2016/0357843 A1 Dec. 8, 2016

Related U.S. Application Data

(60) Provisional application No. 62/172,140, filed on Jun. 7, 2015.

(51) Int. Cl.
*G06F 17/30* (2006.01)
*H04L 29/08* (2006.01)
*G06F 21/62* (2013.01)

(52) U.S. Cl.
CPC .... *G06F 17/30598* (2013.01); *G06F 17/3053* (2013.01); *G06F 17/30507* (2013.01);
(Continued)

(58) Field of Classification Search
CPC ........ G06F 17/30598; G06F 17/30507; G06F 17/30699; G06F 17/30867; G06F 21/6245; H04L 67/06; H04L 67/02
(Continued)

(56) References Cited

U.S. PATENT DOCUMENTS

| 7,584,171 B2 | 9/2009 | Guan et al. |
| 8,954,420 B1 | 2/2015 | Khan et al. |

(Continued)

FOREIGN PATENT DOCUMENTS

| EP | 1176520 | 1/2002 |
| JP | 4714156 A | 6/2007 |

(Continued)

OTHER PUBLICATIONS

PCT/US2016/020134, Feb. 29, 2016 (filing date), Apple Inc.
(Continued)

*Primary Examiner* — Shahid A Alam
(74) *Attorney, Agent, or Firm* — Fletcher Yoder PC

(57) ABSTRACT

Aspects of the present disclosure involve a mobile or computer reader application that obtains articles or other computer files from a central database and displays the articles to a user of the device. The reader application may be customizable around one or more characteristics of the user of the device. In one embodiment, the type and number of articles provided to the device and displayed in the reader (Continued)

application may be based on the determination of a category or type of usage of the application is performed by the user. Further, the determination of the use of the reader application on the device is performed by and contained within the device such that usage information is not shared with overall article providing system. In another embodiment, the article providing system and/or device may determine recommendations to provide to a user of the reading application. These recommendations may be based on one or more selected interests or topics of the user of the reading application.

20 Claims, 13 Drawing Sheets

(52) U.S. Cl.
CPC .. *G06F 17/30699* (2013.01); *G06F 17/30867* (2013.01); *G06F 21/6245* (2013.01); *H04L 67/02* (2013.01); *H04L 67/06* (2013.01)

(58) Field of Classification Search
USPC .......................................................... 707/738
See application file for complete search history.

(56) References Cited

U.S. PATENT DOCUMENTS

| | | | |
|---|---|---|---|
| 9,032,021 | B2 | 5/2015 | Lim et al. |
| 2005/0138049 | A1 | 6/2005 | Linden |
| 2005/0149498 | A1 | 7/2005 | Lawrence et al. |
| 2006/0167872 | A1* | 7/2006 | Parikh ................... G06F 3/0237 |
| 2008/0120288 | A1* | 5/2008 | Guan ................ G06F 17/30867 707/705 |
| 2009/0300547 | A1 | 12/2009 | Bates et al. |
| 2013/0316746 | A1 | 11/2013 | Miller et al. |
| 2014/0108395 | A1 | 4/2014 | Polonsky et al. |
| 2015/0066959 | A1 | 3/2015 | Yi et al. |
| 2015/0178282 | A1* | 6/2015 | Gorur ............... G06F 17/30867 707/748 |

FOREIGN PATENT DOCUMENTS

| | | |
|---|---|---|
| KR | 10-2013-0065759 A | 6/2013 |
| WO | WO 99/06924 | 2/1999 |

OTHER PUBLICATIONS

International Search Report and Written Opinion of PCT/US2016/020134, dated Jul. 5, 2016, Apple Inc.

Korean Search Report for Korean Application No. 10-2017-7034551 dated Dec. 26, 2017; 10 pgs.

Korean Office Action for Korean Application N. 10-2017-7034551 dated Apr. 19, 2018; 7 pgs.

* cited by examiner

600

804

|  | Entity 1 | Entity 2 | Entity 3 | ⋯ | Entity n |
|---|---|---|---|---|---|
| Article 1 | 1 | 1 | 1 | ⋯ | ⋮ |
| Article 2 | 0 | 0 | 0 | ⋯ | ⋮ |
| Article 3 | 1 | 0 | 1 | ⋯ | ⋮ |
| Article 4 | 0 | 0 | 1 | ⋯ | ⋮ |
| Article 5 | 1 | 1 | 0 | ⋯ | ⋮ |
| Article 6 | 1 | 1 | 1 | ⋯ | ⋮ |
| ⋮ | 1 | 1 | 1 | ⋯ | ⋮ |
|  | 0 | 0 | 0 | ⋯ | ⋮ |
| Article X | ⋮ | ⋮ | ⋮ | ⋯ | ⋮ |

READER APPLICATION WITH A PERSONALIZED FEED AND METHOD OF PROVIDING RECOMMENDATIONS WHILE MAINTAINING USER PRIVACY

RELATED APPLICATIONS

This application claims priority under 35 U.S.C. § 119(e) to U.S. Provisional Application No. 62/172,140 entitled "READER APPLICATION WITH A PERSONALIZED FEED AND METHOD OF PROVIDING RECOMMENDATIONS WHILE MAINTAINING USER PRIVACY", filed on Jun. 7, 2015 which is incorporated by reference in its entirety herein.

TECHNICAL FIELD

This disclosure relates generally to mobile applications, and more specifically to a reader application that provides written articles or other types of files to a user of the application for consumption by the user on the user's mobile device.

BACKGROUND

As the popularity of computing devices increases, users more frequently obtain and consume information from the Internet through said computing devices. For example, many users access online magazines or newspaper websites through a browser or other Internet accessing application on the device to read or otherwise consume articles available through websites. Typically, however, the user must manually access the website to check the website for new content. Continuous checking of websites for new content may be time consuming for a user and a drain on resources of the computing devices.

In response, reader aggregators have been developed that instructs a browser of a computing device to constantly monitor a website for new articles or other content and inform a user of the feed of any updates. In some instances, the reader aggregator is configured to download all new articles or content uploaded to a website. The reader aggregator also generally provides a user interface through which the new content is available to be consumed. However, such reader aggregators are generally conduits through which all new information and/or articles from a website to which a user of the aggregator subscribes are collected. Analysis of the available content and configuration of the content provided to the aggregator are severely limited in typical reader aggregators.

SUMMARY

One implementation of the present disclosure may take the form of a method for providing a computer file to a computing device. The method includes the operations of receiving, from the computing device, an indication of an interest by a user of the computing device in a first parameter of a first subset of a plurality of article-type computing files available from a computer file providing system and correlating the first parameter of the first subset of the plurality of article-type computing files to a second parameter of a second subset of the plurality of article-type computing files available from a computer file providing system, the first parameter different than the second parameter. The method further includes the operations of calculating a recommendation for one or more articles of the plurality of article-type computing files available from a computer file providing system based at least on the correlation of the first parameter and the second parameter and transmitting a recommendation indicator to the computing device for the one or more articles of the plurality of article-type computing files available from the computer file providing system.

Another implementation of the present disclosure may take the form of a system for file sharing. The system includes a file database storing a plurality of article-type computing files and a computing device in communication with the file database. The computing device of the system includes at least one processor, at least one communication port for communication with the file database and a user device, and a tangible computer-readable medium with one or more executable instructions stored thereon. When the instructions are executed, the at least one processor performs the operations of receiving, from the user device, an indication of an interest by a user of the user device in a first parameter of a first subset of the plurality of article-type computing files, correlating the first parameter of the first subset of the plurality of article-type computing files to a second parameter of a second subset of the plurality of article-type computing files, the first parameter different than the second parameter, calculating a recommendation for one or more articles of the plurality of article-type computing files in the file database based at least on the correlation of the first parameter and the second parameter, and transmitting a recommendation indicator to the user device for the one or more articles of the plurality of article-type computing files.

Yet another implementation of the present disclosure may take the form of a non-transitory computer-readable medium storing one or more executable instructions to perform a computer-implemented method. The method includes the operations of receiving, from the computing device, an indication of an interest by a user of the computing device in a first parameter of a first subset of a plurality of article-type computing files available from a computer file providing system and correlating the first parameter of the first subset of the plurality of article-type computing files to a second parameter of a second subset of the plurality of article-type computing files available from a computer file providing system, the first parameter different than the second parameter. The method further includes the operations of calculate a recommendation for one or more articles of the plurality of article-type computing files available from a computer file providing system based at least on the correlation of the first parameter and the second parameter and transmitting, from a device server, a recommendation indicator to the computing device for the one or more articles of the plurality of article-type computing files available from the computer file providing system.

BRIEF DESCRIPTION OF THE DRAWINGS

FIG. 6A illustrates a matrix comparing a selected number of articles stored in an article database to each of a group of entities stored in an entity database.

FIG. 6B illustrates a collection of co-occurrence scores computed from the matrix 600 of entities maintained in the entity database to any number of articles stored in the article database.

DETAILED DESCRIPTION

Figure 1:
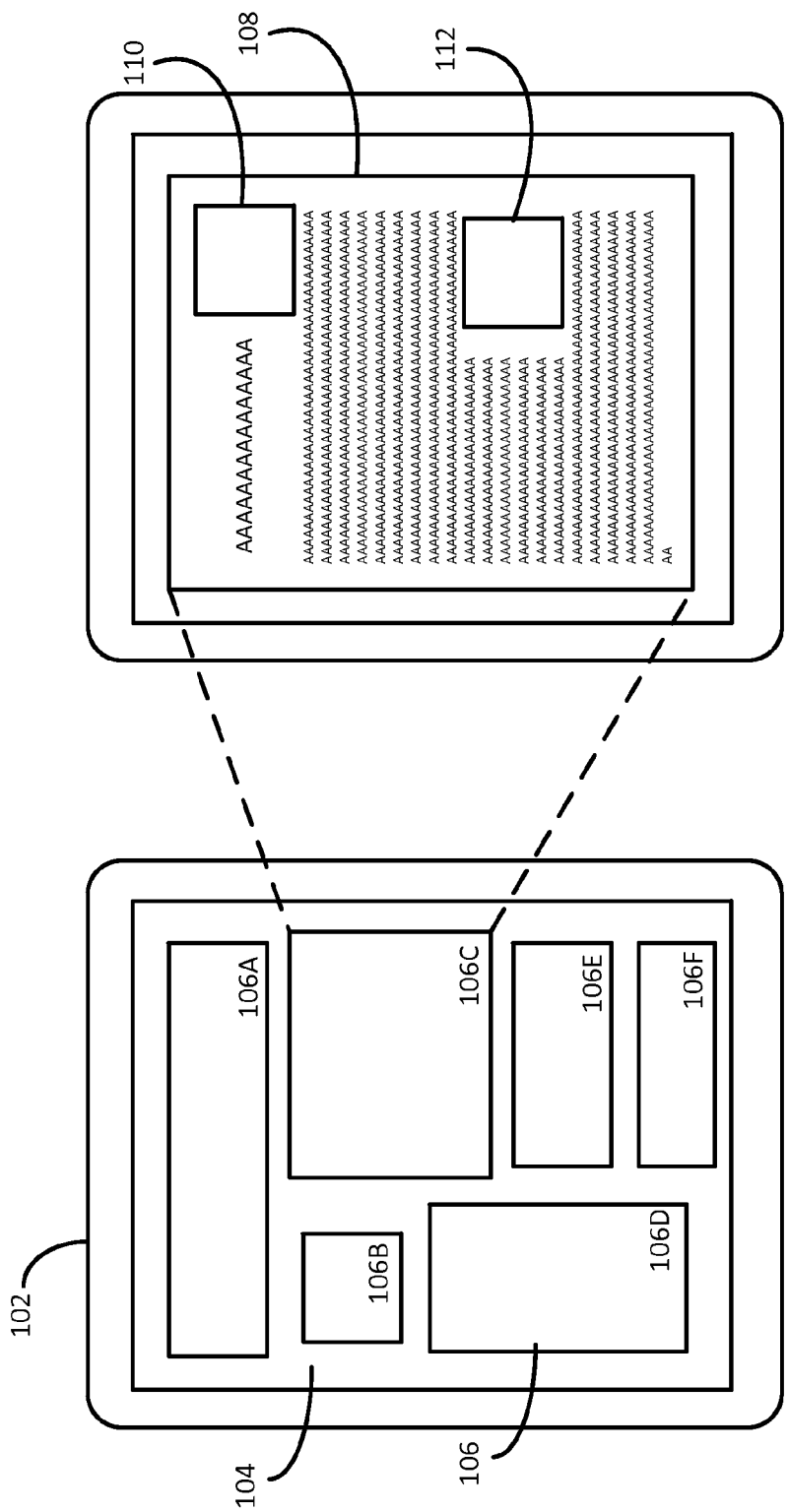
FIG. 1 is a front view of a mobile computing device executing a reader application for displaying one or more articles.

Aspects of the present disclosure involve a reader application that obtains electronic articles or other computer files from one or more databases, data stores, to other data sources which may be operating on a mobile device, tablet, or other computation platform and displays a selection of articles that a user of the device may view on the device. In one embodiment, the reader application displays available articles within a user interface of the reader application. One or more of the articles may be selected by the user of the device to read or otherwise consume the content of the article. In one particular embodiment, the available articles are presented in the reader application as a collection of cells or other indicators of the article's availability that may include portions of the article, such as the article title, a photograph, a portion of the article's text, and the like. In general, articles may be any electronic or computer data file that provides information about a topic or news item and may include images, embedded videos, music or other audio files, graphic interchange format (GIF) images, text, links to webpages or other documents, and any other type of computer data. In one particular embodiment, the articles available through the reader application include web-based documents created through one or more publishers of web-based content. In other embodiments, the articles may be from Rich Site Summary (RSS) feed of articles and/or from publishers utilizing as article writing program utilizing the JavaScript Object Notation (JSON) standard format. Regardless of the article format type, once selected such as by touching a cell in a device with a touchscreen, the article may encompass the entirety of the user interface of the reader application or a portion of the interface for reading by the user of the device.

The reader application may also be customizable around one or more characteristics of the user of the device. For example, the user may select a particular topic about which the user wishes to receive articles through the reader application. An article providing system or computer architecture then selects from a large cache of articles and provide particular articles to the user's device and reader application based on the user's selection of the particular topic. Further, the type and number of articles provided to the device and displayed in the reader application may be based, in one embodiment, on the determination of a category or type of usage of the application is performed by the user. For example, a frequent or heavy user of the reader application is provided with more articles than a lighter user of the application. In addition, different types of articles, perhaps based on a relative ranking or scoring of the articles, may be provided to the device based on the usage determination. Thus, the number and types of articles provided to the reader application is tailored to the use of the reader application at the device.

Maintaining the privacy of a user of the device is one advantage to the user experience of the reader application. Thus, in one embodiment of the reader application, the determination of the use and the characteristics of the reader application on the device are performed by and contained within the device such that usage information is not shared with the overall article providing system. In particular, the system transmits logic to the device, such as a rule set, to determine the reader type of a user of the device (i.e., heavy user, moderate user, light user). The device then monitors the usage of the reader application, such as the number of articles selected per day, the number of articles selected per hour, the duration that the selected article remains in the user interface of the reader application, and the like. The device may then apply the rule set to the monitored usage to determine the user's reading type. However, rather than providing the usage information to the system, the device maintains this information on the device and simply requests a stream of articles from an article cache or bin based on the determined type. The article database or article providing system maintains numerous different article streams that are available to the reader applications. Upon a request for a particular stream, the system provides the requested article stream to the device. In this manner, information pertaining to the use of the reader application for that particular user is maintained within the device and not otherwise shared with the system to maintain the privacy of the user.

In another embodiment, the article providing system may recommend topics, channels, or other information to the reader application user. These recommendations may be based on one or more selected interests or topics of the user of the reader application. In general, the system correlates selected topics or interests to a relational map of all possible topics or interests available through the reader application. These recommendations may be based on particular topics (otherwise known as "entities") or particular publishers (otherwise known as "channels") that are available to follow through the reader application and are selected by the user of the reader application. Such recommendations are provided to a user through the reader application user interface and selected by the user to begin receiving articles pertaining to that topic or channel. Selected recommendations are then provided in the user's reader application interface for selection by the user similar to the other articles provided in the reader application. Similar to above, the privacy of a user of the reader application is achieved as information used to determine which recommendations to show in the user interface of the reader application is maintained at the device and not transmitted to a central server.

A reader application is a program or application executed on a computing device that receives and displays articles or other types of data files for reading by a user of the application. The computing device used to execute the reader application may be any type of computing device, such as a personal computer, a laptop computer, a mobile phone, a tablet, and the like. One particular example of the reader application is illustrated in FIG. 1 as executed on a mobile phone device. In this example, a user of the device 102 selects a reader application on the device, such as through the selection of an icon on the device display. When executing, the reader application 104 provides a user interface that includes cells, links, or icons representative of available articles. In one embodiment, the user interface of the reader application 104 includes a list of available articles. In another embodiment, shown in FIG. 1, the reader application includes several icons 106, or "cells", that are selectable by a user of the device 102. To view an article, the user touches or otherwise selects the respective cell 106 to launch or otherwise access the article represented by the cell. In this manner, the articles available through the reader application 104 may be read or otherwise accessed by the user of the device 102.

In the embodiment illustrated in FIG. 1, the reader application 102 may alter the user interface provided to the user of the device 102 once an article is selected. In particular, when a cell 106c is selected, the article may be displayed on the device 102 to at least partially cover the user interface of the application. In general, the display of the selected article 108 is provided such that a user of the device 102 may read the text of the article or consume some other aspect of the data file (e.g., play a video). Additional portions of the article 108 may be available by scrolling down using the user interface, if additional portions of the selected article are present. For example, a user of the device 102 may use their finger to swipe up to access additional portions of the displayed article 108. The size and accessibility of the selected articles 108 in the reader application may be based on the type of device used to view the article, the type of article selected, the content of the article, and the like. In general, the appearance of the article 108 within the reader application user interface 104 may utilize any amount of space of the device display. Further, accessing the portions of the article may be accomplished through any type of interaction with the reader application 104, including utilizing one or more input/output devices or through a touch-screen of the device 102.

Although discussed herein as a text-based file, it should be appreciated that the articles available through the reader application 104 may be any type of computer data file. For example, the article may include images 110, embedded videos 112, music or other audio files, graphic interchange format (GIF) images, text, links to webpages or other documents, and the like. In one particular embodiment, the articles available through the reader application include web-based documents created through one or more publishers of web-based content and provided to or gathered for displaying within the reader application 104. In another embodiment, the articles are created specifically for the reader application 104 for use by users of the reader application.

Figure 2:
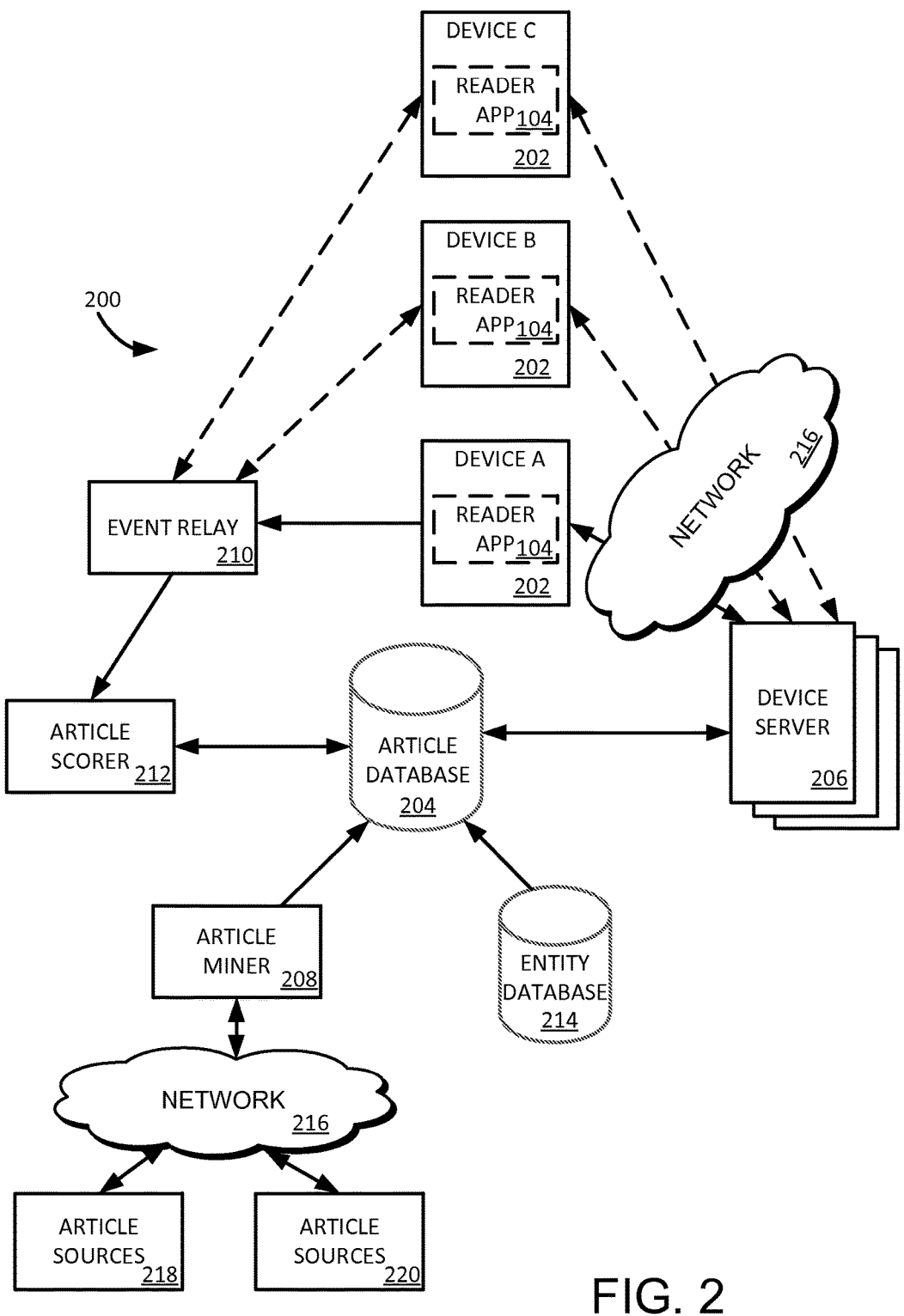
FIG. 2 illustrates a system architecture for providing articles to a reader application of a mobile device.

FIG. 2 illustrates a system architecture for providing articles to a reader application 104 of a mobile device. The system 200 may be used to provide one or more articles to a reader application executing on a computing device 202, such as the mobile device described above. The components of the system 202 may communicate over any number of networks, including telecommunication networks and wireless networks. Further, although illustrated in FIG. 2 as including particular components, it should be noted that the system 200 may include any number of additional or fewer components, including components used to communicate between the components shown. Also, the functionality of the components described below may be applied to two or more components of the system. For example, the article database 204 and the device server 206 may be instantiated in the same device, or may be instantiated over many components of the system 200. When distributed over a large number of devices across a large national or international geography, articles (content) may be cached through a network, and numerous servers 206 may be used to distribute articles to readers, such as might be available with a content delivery network architecture.

As discussed above, the system 200 includes a computing device 202 utilized by a user of the reader application to view articles provided to the device by the system. The device 202 communicates with a device server 206 through wired or wireless communication, such as provided on network 216, which may be public or private or a combination thereof. As such, the device 202 may include one or more communication ports for transmitting and receiving information from the network 216. In one embodiment, the network 216 is a telecommunications network for transmitting information between computing devices. In general, the device server 206 provides data to one or more devices associated with the system. The device server 206 requests and receives one or more articles from an article database 204 to provide to devices 202 in communication with the server. The device server 206 may also perform one or more of the operations described below to configure the articles provided to the reader application based on one or more parameters of the reader application monitored by the user device 202. Further, it should be appreciated that any number of such devices 202 may be connected to or otherwise associated with the system in a similar manner. In one embodiment, thousands of such devices 202 are in communication with the device server 206 to receive articles from the system. The various other computing devices 202 that may form a portion of the system are illustrated in FIG. 2 as device B and device C, although the following description of the system may only discuss the operation of device A, for simplicity.

The article database 204 is a store of articles available to users of the reader application 104. As mentioned, the articles stored in the article database 204 may be any type of computing data file. To populate the article database 204, an article miner 208 module is configured to gather or otherwise receive articles for inclusion in the article database. In one implementation, the article database 204 may be distributed across many physical devices geographically dispersed, and may include origins and edges, depending on the implementation. In one example, a publisher 218 or creator of articles provides articles to the article miner 208 that is operably connected with the article database 204. In another example, the article miner 208 may access one or more websites 220 to obtain links or copies of articles to include the article database 204. Regardless of the origin of the articles, the article miner 208 serves to populate the available articles of the system 200 by storing articles in the database 204.

As discussed in more detail below, each or some articles stored in the article database 204 may include a score or other form of ranking. In general, the article score may reflect initial quality characteristics calculated from various possible metrics for the article, and may reflect the relative popularity of the article to the users of the article system 200. In one embodiment of the system 200, the article score is calculated and associated with the articles by the article scorer 212. The article scorer 212 may provide an initial score to the article when provided by the article miner 208 to the database 204. Further, the system 200 may utilize information concerning the popularity of the article received from one or more device 202 of the system. Thus, an event relay 210 component of the system 200 is configured to receive usage information for articles provided to the devices 202 of the system. Upon receiving the information, the article scorer 212 component may adjust the score associated with an article to further refine the score for the article. In the embodiment of the system 202 that includes any number of devices 202, usage information may be received from each or some of the devices to obtain a large amount of information about a particular article. The utilization of an article score is discussed in more detail below to aid the system in determining the number and types of articles to provide to the reader application on the device 202.

Although the event relay 210 receives information of the relative popularity of a particular article from one or more devices 202 associated with the system 200, it should be noted that such information may not include identifying information of a particular user of the device or system. For example, the device 202 may protect the identity of a user of the device 202 by transmitting usage information of a particular article anonymously to the event relay 210. In particular, each device 202 of the system 200 may include an anonymous and alterable identification that identifies the device as a part of the system, but does not include any information about a user of the device. In one implementation, the anonymous identification may be changed by the device to further protect the identification of a user of the device. As long as the system 200 can identify the device 202 as being a part of the system, personal identification of a user of the device is not needed by the system and, in particular, is not transmitted to any other component in the system. In this manner, usage information for a particular article may be received and analyzed by the system to adjust the scoring of an article without associating the information with a particular user of the system 200. In other words, the information gathered by the event relay 210 may be general population information regarding the particular article and not information specific to any one user of the system 200. As such, the privacy of the users of the system 200 is maintained while also providing a system that may adjust to elevate interesting or high quality articles through the adjustment to the score associated with one or more articles in the article database 204.

The system 200 may also include an entity database 214 that stores any number of topics, or "entities", which may be associated with an article in the article database 204. In general, each article in the article database 204 is associated with an entity that describes some topic of the article. For example, an article about a baseball game may include specific entities such as entities of each of the particular teams involved in the game, entities for players involved in the game (whether specifically mentioned in the article or not), entities for the location at which the game was played, and more general entities, such as "baseball", "sports", "news", and the like. Other entities of the article may identify the author and/or publisher of the article. Any number of entities may be associated with the article to aid the system 200 in classifying the articles within the article database 204 and providing articles of interest to users of the reader application.

In one embodiment, the entity database 214 is populated with potential entities manually by one or more administrators of the system. In another embodiment, the entities may be automatically culled or gathered from any type of database of potential article topics. For example, the system 200 may access a publicly or privately edited collection of potential article topics, such as an interconnected collection of web pages, to include in the entity database 214. The collection of web pages may be accessibly by the system through several internet protocol (IP) addresses and processed to obtain information for inclusion in the database. The collection of web pages may be general knowledge information or may be specific to a particular area of study, such as medicine or technology. Moreover, multiple database stores of article topics may be parsed and the results aggregated. The list of entities in the entity database 214 may also include identifications of channels or publishers that provide articles to the system 200. Regardless of how the entity database 214 is populated with potential entities, at least one entity may be associated with an article stored in the article database to indicate to the system the topics included in the article. Further and as explained in more detail below, a user of the reader application may select one or more entities in which the user is interested to receive articles pertaining to the selected entity. In this manner, the types of articles received at the reader application executed on the device 202 are configurable to the user's interests.

Through the reader application, a user of the device 202 receives articles from the device server 206 of particular interest to the user. In one embodiment, the articles are provided to the reader application in feeds. For example, one feed of articles provided to the device 202 is a topic or entity feed such that the articles provided are specified by one or many instances of the entity associated with an entity by the system. Another feed includes a feed of articles from a particular publisher or article provider. Yet another feed includes articles from several entities selected by the user and is presented to the user in the reader application interface as a mixed collection of articles. For example, a particular user may select a "sports" entity and a "photography" entity to receive articles pertaining to each of those topics. In this example, the user's reader application may receive a "sports" feed of articles, a "photography" feed of articles, and a feed that includes a mix of both "sports" articles and "photography" articles. Thus, receiving available articles at the reader application is configurable by the user to enhance the user's experience and increase the likelihood that the user receives articles of the user's liking. Another feed may be presented that includes any type of article selected by the system 200 to provide to users of the reader application.

As described, a user of a device 202 may receive articles associated with a particular topic or topics through the reader application. However, not every user of the system 200 has the same level of engagement and/or use the reader application in the same way. For example, some users may be heavy users or otherwise access the reader application to read or scan or otherwise consume many articles. Other users, in contrast, may only access the reader application every other day or once a week. To address the varying levels of engagement with the reader application, the system 200 may adjust the number and types of articles provided to a particular user based on the user's interest or engagement level. Such a configuration of the system 200 may be provided while maintaining the privacy of the user's interaction with the particular articles provided to the reader application and the user's identification.

To provide articles to a user of the reader application based on a measured engagement level of the user, the system 200 is configured to provide different article feeds to the device 202 based on a request from the device. In general, the different article feeds, or article "bins", include articles of the same topic or entity, but are provided to the device 202 at a different rate and may include articles of different scores. The articles may be transmitted to the device by the system 200, provided to the device in response to a request from the device, or a combination of both. For example, a first bin of articles may include all or most articles of a specific topic that is made available by the system, while another article bin may include only the top rated articles. The article bins may be associated with a particular type of user of the reader application. Thus, a device 202 executing the reader application may request articles from a particular bin based on a determination of the type of user of the reader application. Content bin requests may be based on time, refresh actions by the user (on an article basis or per entity or feed or otherwise), when the reader is launched, or otherwise.

Figure 3:
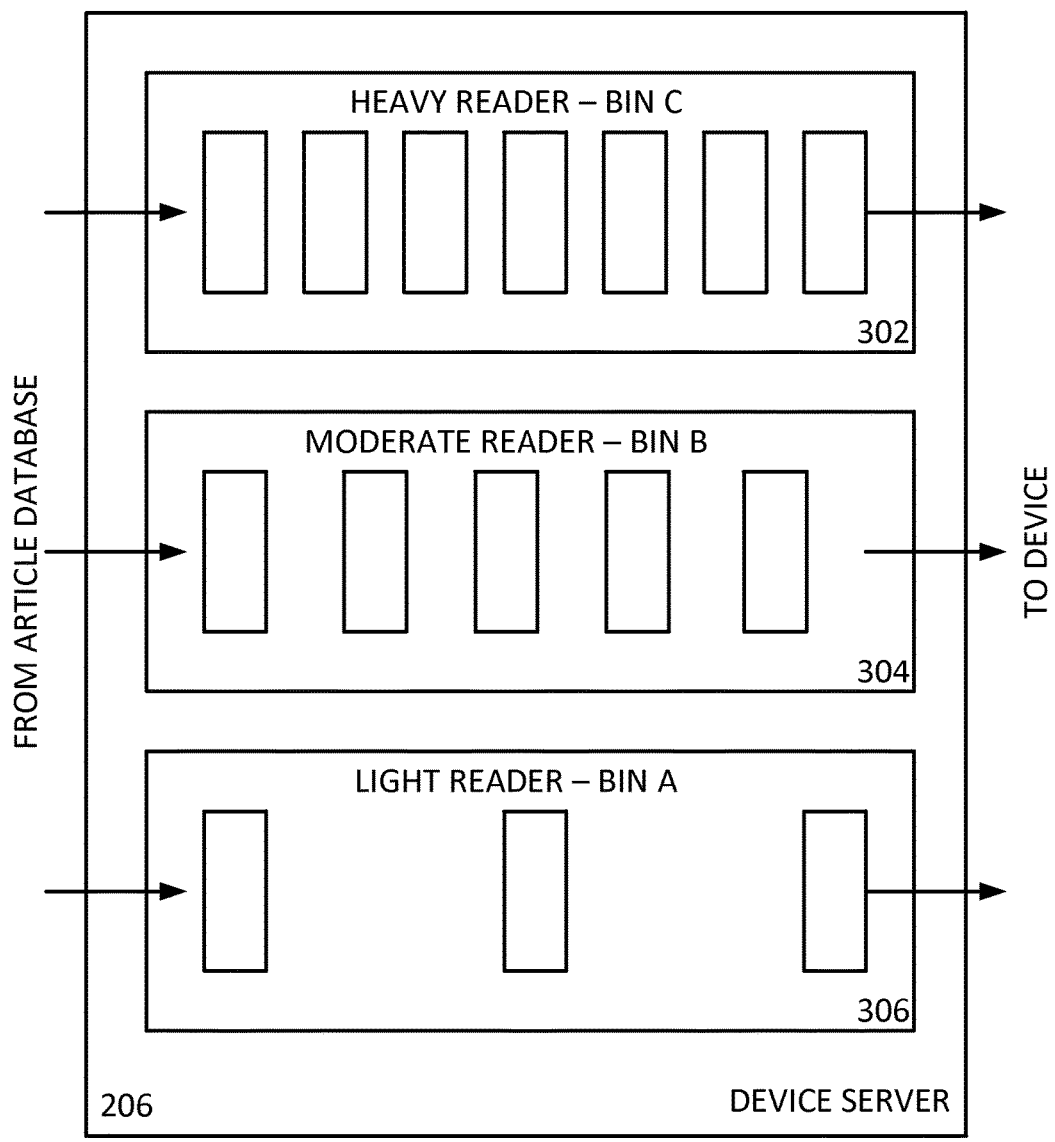
FIG. 3 illustrates several articles feeds available to a reader application of a mobile device.

FIG. 3 illustrates one embodiment of a device server 206 that provides several articles feeds available to a reader application of a device. Although discussed herein as part of the device server 206, the article bins may be created and/or stored in the article database 204 or any other component or components of the system. Also, the bins may not be actual collection of articles but rather identifiers of a particular article feed from the system. For example, all of the available articles may be stored in the article database 204; which may be a distributed database. Upon receiving a request for a stream of articles from a particular bin, the article database 204 may obtain one or more articles that meet the criteria for the requested bin and provide those articles to the device server 206 for transmission to the device 202. Thus, the articles may be stored in the article database 204 in any manner that is accessible for retrieval and transmission to the device server 206.

In general, the article bins 302-306 include articles tailored for a particular type of user of the reader application. For example, the device server 206 of FIG. 3 includes a heavy reader article bin 302 (also referred to herein as "bin C"), a moderate reader article bin 304 (also referred to herein as "bin B"), and a light reader article bin 306 (also referred to herein as "bin A"). However, any number and types of article bins may be included in the system 200. Bin designations may be on a per entity and/or a per channel basis, and otherwise. For example, an article bin associated with a new user (or a user whose engagement or use of the reader application has not been determined) may be included in the collection of article bins. In general, the possible use levels of the users of the reader application may be any number and one or more article bins 302-306 may be provided for each possible use level, may be provided more than one use level, or provided for the situation where no use level is determined.

As mentioned, the article bins 302-306 are associated with a particular topic or entity and articles of any given bin may overlap with articles in another bin. Also, the articles contained in the article bins 302-306 may be provided to the reader application of the device 202 at different rates. For example, article bin C 302 may include each article for that particular topic that is received at the article database 214. Article bin B 304 may include fewer articles than the number of articles in article bin C 302, while article bin A 306 may include still fewer articles than article bin B and article bin C. In addition, the articles included in the article bins 302-306 may be based on the score or rank associated with the articles. For example, because article bin C 302 includes each article received at the article database 204, the ranking or score of the article is not considered or a relatively lower score is accepted for inclusion in the bin. However, because not every article received is included in article bin B 304, a certain score threshold may be associated with article bin B such that only those articles with scores above or equal to the threshold are put in article bin B. So, a rabid consumer or news about soccer may receive a large flow of articles, and to maintain that flow more articles are allowed in the bin, whereas a less frequent consumer of news about photography may receive a lesser flow of articles. Similarly, as even fewer articles are included in article bin A 306, the score threshold associated with bin A is higher than that of bin B. In this manner, each article bin 302-306 may have a score threshold associated with the bin such that only articles with a score that meets or exceeds that score threshold are included in the particular article bin.

Limiting the number of articles included in one or more of the article bins 302-306 to those that exceed a score threshold operates to tailor the type of articles provided to the reader application to those that are of higher quality (or a higher popularity) and limits the number of articles provided to the reader application to prevent overloading the feed for that topic to the user of the device 202 and/or provide a more tailored or discriminating feed. For example, the score threshold associated with article bin A 306 may be set to provide the best article of a 24 hour period for that particular topic to a reader application that requests articles from bin A. Thus, the reader application of a device 202 requesting articles from bin A 306 receives one article a day, with that article being the highest rated article for the day. A user of the reader application that accesses the application once per day may then receive the best article of the day without having to sift through all of the other articles for that topic. Similarly, the score threshold associated with article bin B 304 may be set to provide the best article of the last hour for that particular topic to a reader application that requests articles from bin B. Thus, a moderate user of the reader application may receive the highest rated article from the last hour such that the moderate reader receives 24 articles in a single day. Alternatively, the reader application may receive the current bin article (or articles) when a request is made for a bin. If an article is already present at the device 202, the system 200 may refrain from resending the article to the device. The device 202 used by such a reader may request articles from article bin B 304 to receive articles tailored to the user's engagement with the reader application.

In another example, an article bin 302-306 is configured to provide a highlight of the best articles over a past period of time in the past. For example, the highest rated articles for each day of the previous week may be associated with an article bin and provided to a reader application when the device requests the articles from that particular bin. In another example, all of the articles over the last week, regardless of which day the article was published or received at the article database 204, may be included in the highlight bin and provided to a reader whose engagement with the reader application indicates that articles should be requested from the highlight bin.

As should be appreciated, the parameters associated with the article bins 302-306 are configurable and may be adjusted by the system 200 as desired. For example, as more and more articles for a particular topic or entity are obtained by the system 200, the threshold value associated with the article bin 302-306 may be adjusted to maintain a preferred number of articles in the particular bin. For example, bin A 306 may be configured to provide one article per 24 hour period to requesters of bin A. Thus, if more than one article exceeds the score threshold associated with that bin, the threshold value for the bin may be adjusted to include only the highest rated article. Similarly, if the number of articles included in a particular bin 302-306 does not exceed a lower limit of articles, the score threshold associated with the bin may be adjusted down so that additional articles are included in the bin. Thus, the score threshold associated with any article bin 302-306 may be adjusted by the system, in real time, to include a higher or lower popularity articles and/or a higher or lower number of articles in the particular bin. This analysis may include device feedback received through the event relay 210 as the scores associated with a particular article are automatically adjusted.

Further, the types and numbers of articles included in an article bin 302-306 may be further dependent on a particular entity to which the articles in the bins are related. For example, a light reader article bin 306 for a first entity may provide three articles per day to a subscriber of the first entity. In other words, a device 202 may request articles from the light reader bin 306 if a user of a reader application executed on the device subscribes to the first entity. In addition, a light reader article bin for a second entity may be configured to provide eight articles per day to a subscriber of the second entity. In a similar manner, the score threshold associated with a particular bin may also be dependent upon an entity associated with the articles in the bin. As such, the system 200 may tailor the types and number of articles included in any bin to be particular to a specific entity. Also, as explained in more detail below, the parameters of the number and types of articles included in bins for a particular entity may be adjusted as more information concerning the general popularity of the entity is received by the system 200.

In one embodiment, the system 200 includes an "exploration" bin in the article database 204 or device server 206. The exploration bin is configured to provide newly received articles to the article database 206, to a random or focused group of devices 202 associated with the system 200. In one example, these devices 202 may be those associated with heavy readers or users of the reader application. In another example, any type of reader or device 202 using the reader application may receive the articles from the exploration bin. After some time has elapsed (such as 10 minutes or one hour), the system 200 receives anonymous information concerning the popularity, quality, and/or other attributes of the article in the exploration bin from the event relay 210 and a score is associated with the article (through the article scorer 212) and stored in the article database. Such information may be obtained by the device 202 and transmitted to an event relay 210 of the system 200 anonymously such that no identifying information of a user of the device is transmitted to the system. In one implementation, the device utilizes the anonymous identification of the device 202 discussed above. In yet another example, the system 200 scores the article after receiving a particular number of article surveys from the devices 202 of the system rather than after a set period of time.

In this manner, a newly received article from the article miner 208 may receive an initial score based on the popularity of the article from devices that received the article from the exploration bin. This initial score may then be utilized to place the article in one or more of the other article bins 302-306 associated with the system 200. In another embodiment, the system 200 assigns an initial score to the article based on any criteria associated with the article, such as the publisher, the author, the length, the content, etc. In yet another embodiment, the system 200 assigns an initial score based on the article particulars and adjusts the score according to the popularity of the article from users receiving the article from the exploration bin. Through the use of the article scores, the type of articles included in each bin 302-306 is determined. For example, the best articles for a particular entity at any given point are included in the light reader bin 306 based on the scores assigned or received for articles for that entity.

Figure 4A:
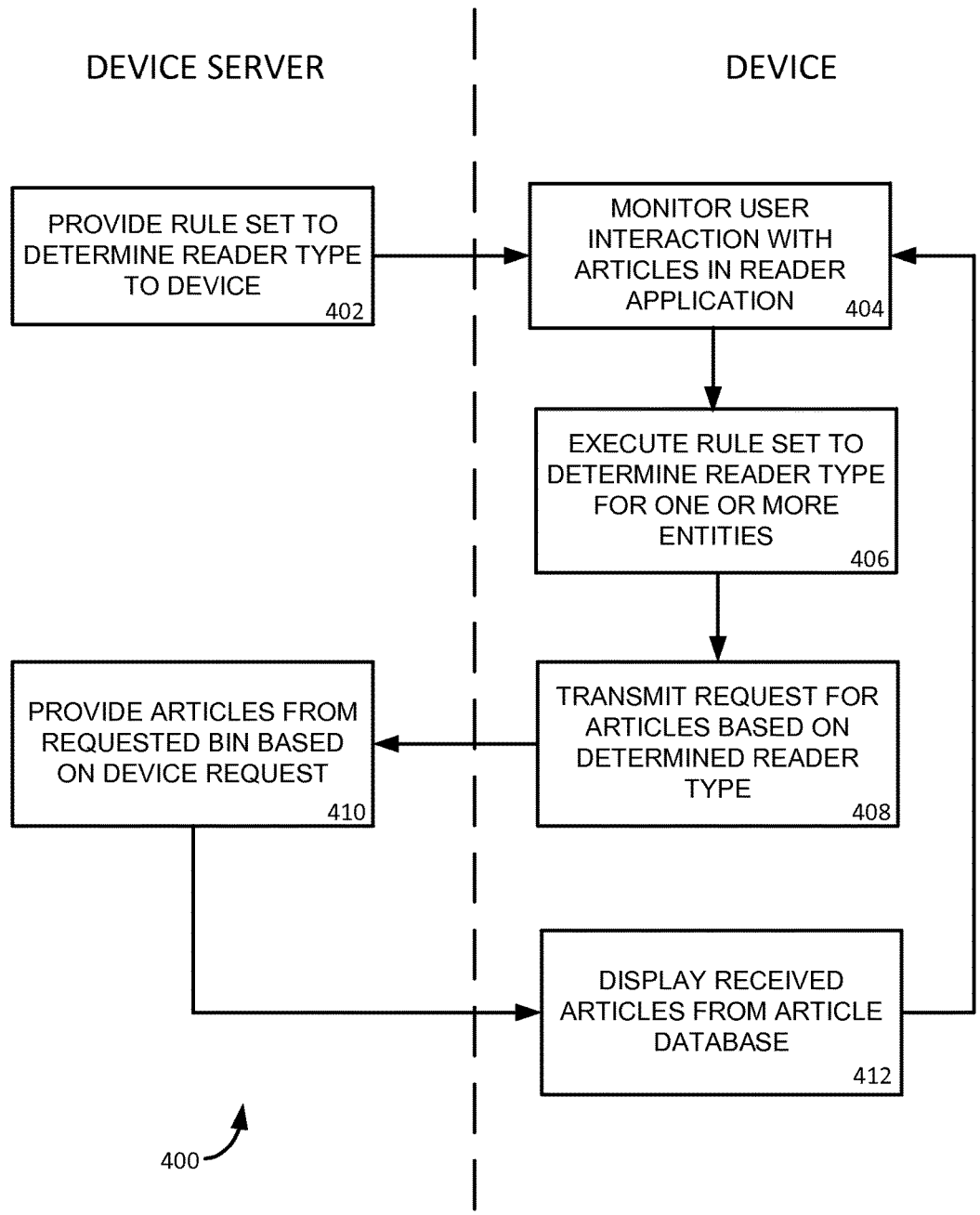
FIG. 4A is a flowchart of a method for providing an article feed to a mobile device while maintaining the privacy of a user of the mobile device.

Protecting a user's identity and particular usage of an article ("privacy") through the reader application increases the user experience of the application. Thus, although the article bins 302-306 are tailored to the type of engagement of a user with the reader application, the particular articles accessed and time spent interacting with any one article by that particular user may be maintained by the user's device 202 and not the central article providing system 200. Moreover, the device maintains the bin subscriptions (topic or channel subscriptions) and the server side does not. To protect the user's identity and reader application usage, the method illustrated in FIG. 4A is performed by the system. In particular, the method of FIG. 4A is a method for providing an article feed to a mobile device while maintaining the privacy of a user of the mobile device. The operations of FIG. 4A are performed by components of the system 200, including the device 202 and the device server 206. Those operations performed by the device server 206 (or other central component of the system) are illustrated on the left side of the flow chart and those operations performed at the device 202 are illustrated on the right side of the flow chart. As explained in more detail below, the information obtained by the device about the articles selected by the user and the particular interaction with the article may be maintained on the device 202 such that personal information concerning the reader application user remains private to the user's device.

Beginning in operation 402, the device server 206 provides a rule set to the device 202 or devices associated with the device server. When executed by the device 202, particular use characteristics applied against the rule set determines the usage or reader type of a user of the reader application. In one embodiment, the rule set is configurable by the system 200 to adjust the thresholds that determine the reader type of the user based on observed interactions with the system. Thus, multiple rule sets may be provided to the device 202 as the threshold values for the reader type are altered. For example, a first rule set that defines three reader types is initially provided to the device. At a later time, a second rule set may be provided to the device 202 that defines five reader types. In another example, a first rule set defines a heavy reader type as one who accesses four articles a day for that particular topic. A second rule set may then be provided at a later time that defines the heavy reader as one who accesses seven articles a day for a specific topic as more and more articles are accessed through the system and a general understanding of user interaction with articles of that topic are determined by the system 200. In general, additional rule sets may be provided for any change to the threshold values that define a reader type as desired by the system 200 or an administrator of the system.

In addition, the rule set provided to the device 202 may be based on a particular topic or entity. Thus, when a user of the reader application selects an entity to follow, a rule set for determining the reader type associated with that entity is transmitted to the device. For example, a heavy reader for a "sports" based entity feed is different than a heavy reader for a "photography" entity feed in that the threshold values defined in the rule sets for these entities are different. The various threshold values and use metrics analyzed by the device and used to determine the reader type of the user of the reader application is described in greater detail below.

In operation 404, the reader application (and/or the user's device) monitors a user's interactions with articles for a particular topic or entity. Any number of metrics may be measured and tracked by the device 202. For example, the device 202 may measure the number of entities selected by the user, the age of the subscription to the entity, the time the user spends viewing an article of the entity, the number of open articles of the entity, the number of articles of the entity that are fully read by the user (in one example determined by if the user scrolls to the end of the article), the number of article excerpts accessed, the average number of articles of the entity accessed per day, the average number of articles of the entity that are fully read per day, and the like. In general, the device 202 may monitor any number of metrics for articles of a particular topic to aid in determining the engagement or reader level of the user. As noted, however, the monitoring of the user's engagement with the article is performed by the device 202 such that usage information for any particular user is maintained on the device side of the system 200.

With the information concerning the user's engagement with articles of the particular topic, the device 202 executes the rule set or logic and determines the reader type of the user for that particular topic. For example, the rule set may establish the user is a light reader type if the average number of articles of the entity that are accessed per day is less than or equal to 2 and the average number of articles of the entity that are fully read per day is less than or equal to 1. The rule set may also establish the user is a moderate reader type if the average number of articles of the entity that are accessed per day is less than or equal to 5 and the average number of articles of the entity that are fully read per day is less than or equal to 3. A heavy reader may be determined for the user if the average number of articles of the entity that are accessed per day is greater than or equal to 6 and the average number of articles of the entity that are fully read per day is greater than or equal to 4. A heavy reader type may also be established for the user if device 202 determines that the user is particularly interested in that entity, such as by comparing the number of access to an article for the particular entity to the total number of articles accessed. However, it should be appreciated that any metric may be utilized to determine the user's reader type. Further, the threshold values associated with the metrics that trigger or otherwise indicate a reader type may be any value as desired by the system 200. In this manner, one or more rules are provided to the device 202 and executed to determine a reader type for a particular entity for a user of the reader application.

In one embodiment, the device 202 determines if the user is a "new user" and assigns an article bin for the new user designation. In one example, the rule set determines that the user of the reader application is a new reader if the age of the subscription to the entity is less than 48 hours, or the number of entities selected by the user of the reader application is less than 3, or the number of open articles of the entity is less than 20, or the number of articles of the entity that are fully read by the user is less than 5, or the number of article excerpts accessed is less than 15. If the device determines that the user is a new user, the rule set may set article bin A 306 or other default bin for the user until a more accurate determination of the user's reader type may be determined.

In another example, the rule set may include one or more rules for an article bin feed for the selection to follow a channel or publisher of articles is selected by the user. In one example, the rule set determines that the selection of a channel as an entity to follow by the user provides article bin C 302 to the reader application. However, similar to above, any article bin may be associated with a channel subscriber in the reader application as determined through the provided rule set.

As should be appreciated, the particular rules in the rule set are configurable to include any measurable metric of use of the reader application and article interaction and any threshold value for those metrics. The rule set may also include one or more default rules to assign a reader type to the user if no metric threshold value is reached. Further, the rule set may assign any number of reader types to a user of the reader application. Further still, each entity selected by a user of the reader application may have an individual rule set, or a rule set may be shared among many selected entities. The examples provided above are used for demonstrative purposes only and any variation of the rules may be included in the rule set.

Once the user reader type is determined by the device 202, the rule set also provides a selection of an available article bin from which articles are provided to the device. For example, the rule set may determine that a heavy reader receive articles from article bin C while a light reader receives articles from article bin A. Thus, in operation 408, the device 202 transmits a request to the device server 206 to begin receiving articles from an identified article bin. The request includes some indication of the particular entity associated with the articles and a particular article bin. In operation 410, the device server 206 receives the request for articles from a particular article bin of a particular entity. The device server 206 then provides the articles from the requested article bin from the article database 204 to the device. The device, in operation 412 displays the received article in the reader application executed on the device, such as in a collection of cells or summaries of the provided articles. Upon display, the device may return to operation 404 to monitor the interaction with the articles by the user of the reader application to further refine or reclassify the reader type of the user.

Through the method illustrated in FIG. 4A, a reader application executing on a device 202 requests and receives articles to present or display to a user of the reader application. Further, the articles requested and received at the device 202 may be tailored to the particular article reading habits or engagement with the reading application of a particular user of the device. However, rather than providing those particular habits or engagement activities to a centralized component of the article providing system, the device 202 itself may monitor the user's activities with the reader application. Such monitoring and data gathering of the user's activities may be maintained on the device 202 to maintain the privacy of the user of the reader application. Further, by providing various article bins with varying types and number of available articles, the device requests articles tailored to the user's use of the reader application without transmitting user information to a centralized component.

Thus, the user's privacy is maintained at the device 202 level while providing a desired rate and type of articles to the user's reader application.

Although discussed above with relation to one device, other embodiments of the present disclosure envision many devices operated by or otherwise associated with the user. In such embodiments, the devices may communicate and share information between the devices. Further, such information sharing may occur over a cloud computing system or other networking system. The system 200 may utilize any known or hereafter developed encryption method to maintain the privacy and anonymity of the user of the devices when transmitting information across the cloud or network environment. For example, the reader type of the user determined by the device 202 described above may be shared with the user's other devices. Such information may thus be encrypted and transmitted through the cloud or network environment to the user's other devices. Additionally, the user's devices may include a decryption key to obtain and decrypt the encrypted information. In this manner, the user's information and privacy are maintained as only the user's devices have the key to decrypt the transmitted information.

Figure 4B:
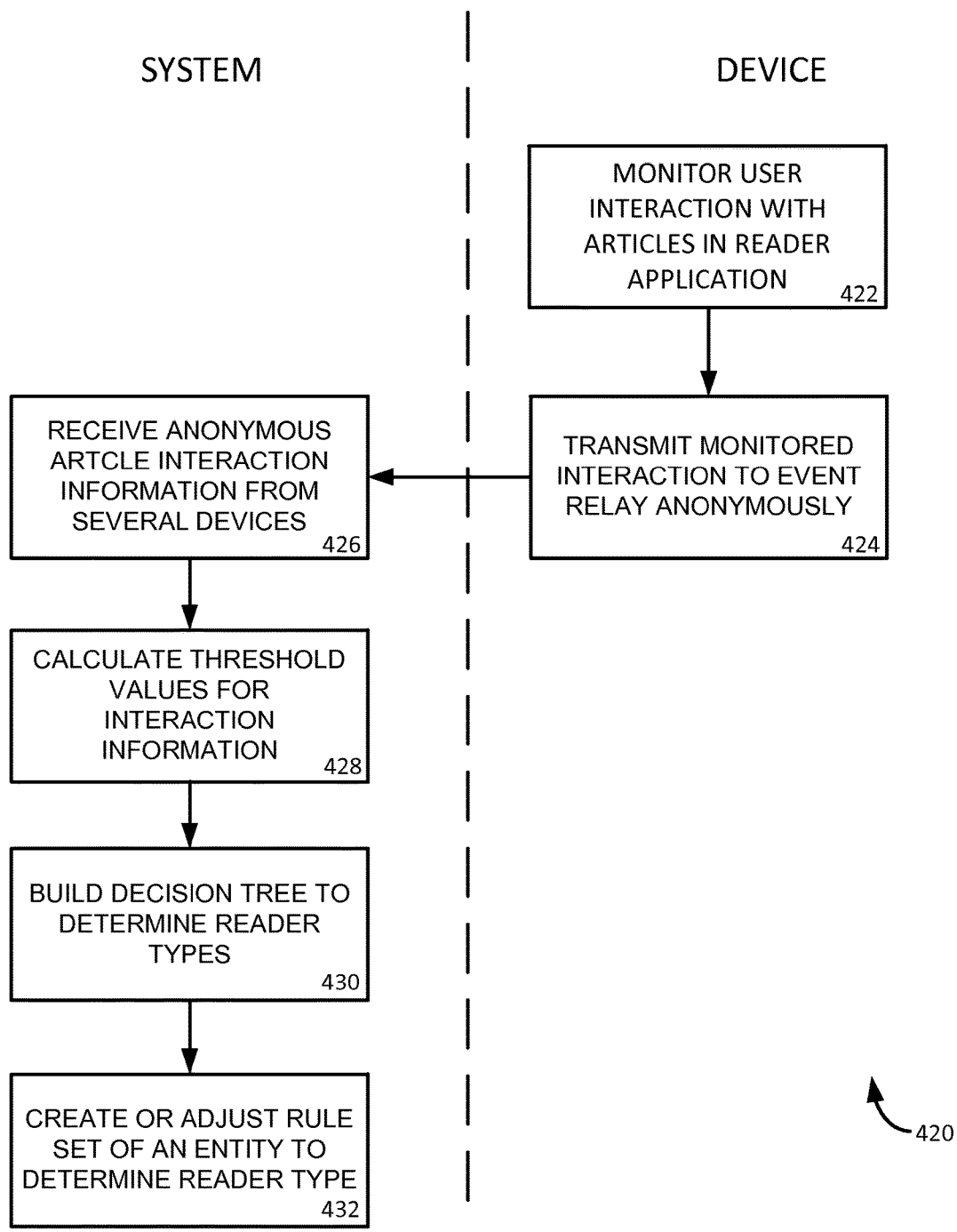
FIG. 4B is a flowchart of a method for updating or creating a rule set to determine a type of reader for receiving articles.

FIG. 4B is a flowchart of a method for updating or creating a rule set to determine a type of reader for receiving articles. Similar to FIG. 4A, the operations of FIG. 4B are performed by components of the system 200, including the device 202. Those operations performed by the system 200 are illustrated on the left side of the flow chart and those operations performed at the device 202 are illustrated on the right side of the flow chart. Through the method 420, the system may create or adjust a rule set used above to determine a type of reader for a particular entity of the article providing system.

Beginning in operation 422, the device 202 detects the access of an article in the user interface of the reader application by a user of the device and monitors the usage of the article by the user, such as the amount of time the article is read, a number and type of "article activities" such as accessing pictures, links, and/or videos of the article, how far down an article a user scrolls to access additional portions of the article, the time of day the article is accessed, and the like. At some later point, the user closes the article, which may also be noted by the device. In operation 424, the device 202 transmits the monitored interaction with the article to the event relay 210 or other component of the system 200 for processing. The usage information transmitted to the system 200 is anonymous in that the information contains no identifying information about a user of the device 202. Rather, the device 202 may transmit the information with an anonymous identifier that indicates the device is a part of the article-providing system 200, but does not identify the particular device or a particular user of the device. In this manner, the information provided about the usage of the article is anonymous to the system 200 of the user's identity.

In operation 426, the system 200 receives the anonymous article interaction information from the device 202. Further, the system 200 may receive such information from any number of devices 202 of the system. For example, a particular article may be provided to several hundred devices 202 associated with the system. Each reader application that receives the article may monitor the interaction with the article and provide such usage information to the system anonymously. The system 200, in return, may combine the usage information from the several devices 202 to determine the general popularity of the article. Similarly, the system 200 may receive such information and correlate the information to one or more entities associated with the articles. In this manner, the system 200 receives some indication of the popularity and use patterns for the entities of the available articles.

In operation 428, the system 200 calculates one or more threshold values for one or more metrics measured by the devices 202 to determine a usage interaction with articles. The system 200 may also identify patterns that may then be categorized. In operation 430, the system 200 builds one or more decision trees which use the categorized usage patterns to determine reader types for a particular entity. For example, an analysis of the received information may indicate that a heavy reader for a particular entity, such as Entity A, reads eight articles per day on average. A similar analysis of the received information may indicate that the a heavy reader for another entity, such as Entity B, reads three articles per day on average. In response, the system 200 may adjust or create the rule set for determining a type of reader for that particular entity in operation 432. In this manner, the system 200 may create different rule sets for each entity based on an observed anonymous and global usage of articles related to that entity.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the parties responsible for the collection, analysis, disclosure, transfer, storage, or other use of such personal information data will comply with well-established privacy policies and/or privacy practices. In particular, such parties should implement and consistently use privacy policies and practices that are generally recognized as meeting or exceeding industry or governmental requirements for maintaining personal information data private and secure. For example, personal information from users should be collected for legitimate and reasonable uses of the party and not shared or sold outside of those legitimate uses. Further, such collection should occur only after receiving the informed consent of the users. Additionally, such parties would take any needed steps for safeguarding and securing access to such personal information data and ensuring that others with access to the personal information data adhere to their privacy policies and procedures. Further, such parties can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

In addition to maintaining the privacy of a user of a reader application, the system 200 may also provide recommendations to users of the application to further increase the overall experience of the application. In general, recommendations are based on one or more entities or channels that are selected by the user of the reader application as being of interest to the user. The system correlates the selected entities and/or channels to a relational map of all possible entities available through the reader application. Once one or more recommendations to other entities and channels are determined, the recommendations are provided to the user through the user interface of the reader application user interface. If the user selects to follow a recommended entity or channel, articles associated with the selected recommendations are provided in the user's reader application interface similar to the other articles already provided in the reader application.

The system 200 may provide recommendations based on a subscription to a particular entity or channel by the user. In one specific implementation, the system 200 provides four types of recommendations: entity recommendations based on a selected entity; channel recommendations based on a selected entity; entity recommendations based on a selected channel; and channel recommendations based on a selected channel. Further, any component or combination of components of the system 200 may be utilized to generate the recommendations provided to a device 202 of the system. In one embodiment, the device server 206 performs the operations described herein to determine which recommendations to provide to a user's reader application. However, it should be noted that the device server 206 does not receive direct information concerning the usage of the articles in a particular reader application to provide the recommendations. Rather, the device 202 executing the reader application determines which entities or channels a user subscribes to and requests the related recommendations calculated by the system 200. In this manner, usage information identifiable to a user of the system 200 is maintained at the user device such that the privacy of the user is preserved.

Figure 5:
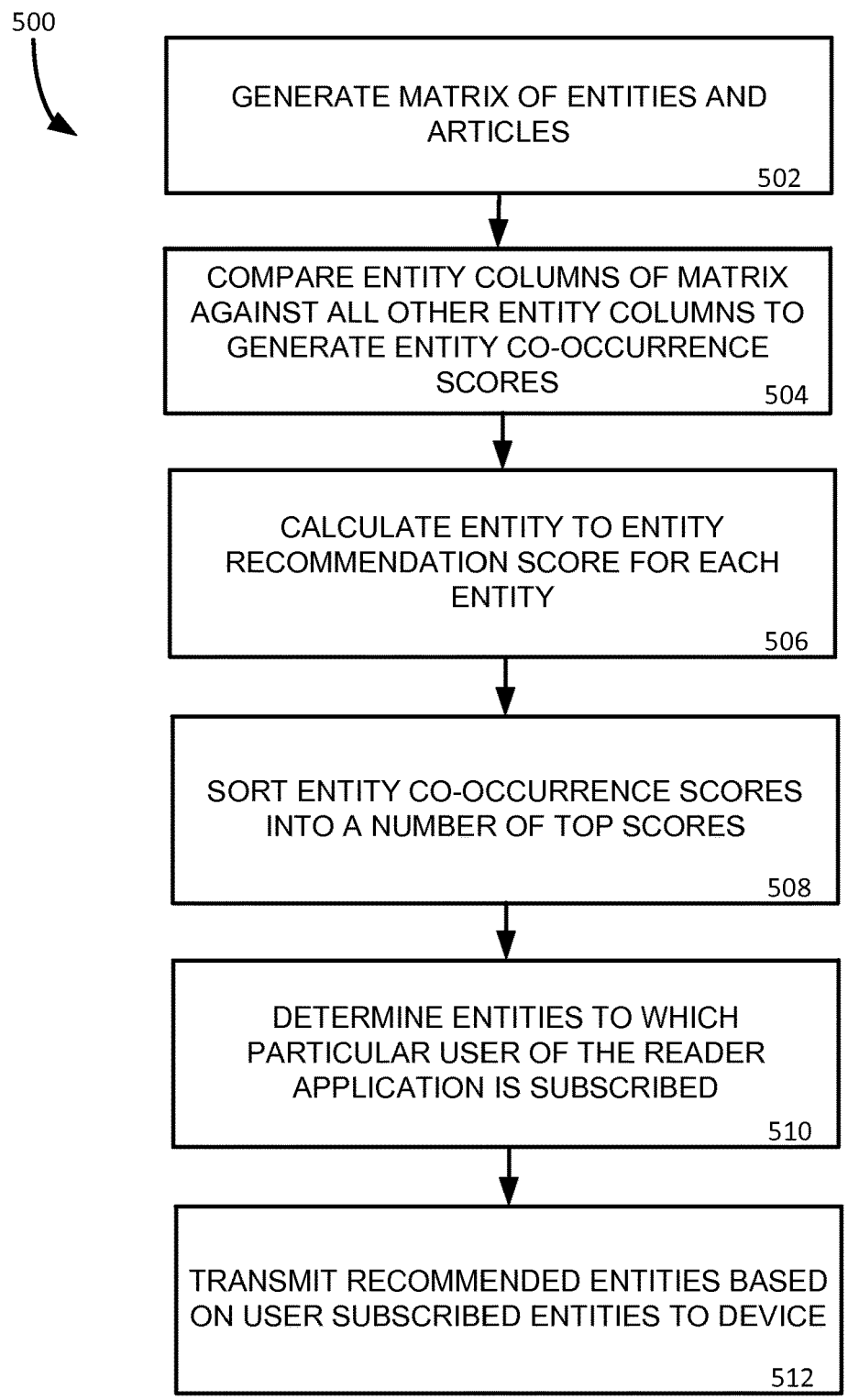
FIG. 5 is a flowchart for a method for determining one or more entity recommendations based on an entity selected by a user of a reader application.

FIG. 5 is a flowchart for a method for determining one or more entity recommendations based on a user's subscription or selection of an entity. The entity selected by the user is utilized by the reader application to obtain articles relating to the selected entity. Thus, presumably, the user is interested in the selected entity. With the interest of the user in the selected entity determined, the article providing system 200 may provide one or more recommendations of other entities or topics in which the user may be interested. Displaying the recommended entities to the user in the user interface of the reader application may prompt the user to select the entity and receive articles related to the recommended entity, thereby increasing the user's experience with the reader application. As mentioned above, the operations of FIG. 5 may be performed by any component of the system 200 or any combination of components, such as the device server 206 and/or device 202.

In operation 502, the system 200 generates a matrix associating entities maintained in the entity database 214 to any number of articles stored in the article database 204. As discussed above, each article in the article database 204 has one or more entities associated with the article where the entity indicates a topic discussed or included within the article. FIG. 6A is one example of a matrix 600 including a selected number of articles from an article database 204 and each of the entities from an entity database 214. The selected number of articles included in the matrix 600 ("Article 1" through "Article X") are shown in a column along the right side of the matrix and the entities ("Entity 1" through "Entity n") are listed along the top side. Although the number of articles and entities included in the matrix 600 may be any number, in one embodiment each entity stored in the entity database 214 of the system 200 is included in the matrix. In another embodiment, the number of entities 604 in the matrix 600 is limited to those entities deemed to meet a threshold popularity by the system 200. Similarly, the number of articles 602 included in the matrix 600 may vary. For example, the number of articles 602 may be every article currently stored in the article database 204, every article stored in the article database over the last 30 days, every article with a score or ranking that exceeds a particular threshold value, and the like.

Within the matrix 600, a series of columns corresponding to an entity 604 is populated with a value indicating whether that entity is associated with the corresponding article. In the example shown in FIG. 6A, a "1" value is located at the cross-section of a particular entity 604 and an article 602 if the particular entity is associated with the particular article. Similarly, a "0" value is located at the cross-section of a particular entity 604 and an article 602 if the particular entity is associated with the particular article. For example, a "1" value is located at the cross-section of Entity 1 and Article 1 indicating that Entity 1 is associated with Article 1 in the article database 204. A "0" value located at the cross-section of Entity 1 and Article 2 indicates that Entity 1 is not associated with Article 2 in the article database 204. Although the values "1" and "0" are used in the matrix, 600 any value may be used in the matrix 600 to provide a true or false case that indicates the association of the entity with the corresponding article.

Once the matrix 600 including the entities 604 and a list of articles 602 is generated, the system 600 compares the column for a particular entity of the matrix against all other entity columns in the matrix to generate an entity co-occurrence score in operation 504. For example, the matrix column for Entity 1 606 is compared to the matrix column for Entity 2 608. The comparison of the columns counts the number of times a "1" value occurs in both columns for the same article. For example, Article 1 includes a true or "1" value for both Entity 1 and Entity 2. Entity 1 and Entity 2 are also associated with Article 5 and Article 6. Thus, the comparison (if limited to Article 1 through Article 6) would result in three co-occurrences of both entities in the listed articles 602. This comparison continues for each entry in the entity columns 606-608 down through Article X to compute a co-occurrence score between Entity 1 and Entity 2.

In a similar manner, the column for Entity 1 606 is compared to the column for Entity 3 610 and a co-occurrence score for that comparison is calculated. This operation continues until Entity 1 is compared to every Entity column in the matrix 600 and a co-occurrence score is calculated. Further, the column for Entity 2 608 is compared to Entity 1 column 606, Entity 3 column 610, and so forth up to Entity n column.

FIG. 6B illustrates a collection 620 of co-occurrence scores computed from the matrix 600 of entities maintained in the entity database to any number of articles stored in the article database. The values including the co-occurrence score table 620 are generated from the comparison of entity columns described above. Each of the scores calculated by a comparison of Entity 1 column 606 to the other columns in the matrix 600 is included in column 622 of the table 620. For example, the particular table 620 shown in FIG. 6B illustrates that there are 42 co-occurrences between Entity 1 column 606 and Entity 2 column 608, indicated in the table as "$(e_1, e_2)$=42". Similarly, there are 27 co-occurrences between Entity 1 column 606 and Entity 3 column 610, indicated in the table as "(e₁, e₃)=27". Column 624 of the table 620 provides the co-occurrence scores for the comparison of Entity 2 column 608 to the other columns in the matrix 600, up to column 626 for the comparison of Entity n to the other columns in the matrix. Although included in the table 620 in this manner, the co-occurrence values calculated through the comparison of columns of the matrix 600 may be represented in any fashion.

With the co-occurrence scores calculated, the system may then calculate an entity-to-entity recommendation score for each entity comparison in operation 606. In one particular embodiment, the recommendation score is calculated using the equation:

$$(e_a, e_b) = \left( \frac{\text{Co-occurence score of } (e_a e_b)}{\text{Total number of articles } e_b \text{ appears}} \right) \times \text{Number of unique entities of } e_b \quad (1)$$

where the co-occurrence score is the score contained in the table 620 of FIG. 6B for a given entity comparison and the total number of articles the compared entity appears is a count of all of the articles the compared entity appears. For example, the co-occurrence score for the comparison of Entity 1 to Entity 2 is 42 from the table 620 of FIG. 6B. The total number of articles the compared entity appears is the total number of "1" or true values in the Entity 2 column 608 of the matrix 600. This value is included in equation (1) to normalize the co-occurrence score. For example, some very popular or general entities appear is several articles regardless of if that entity is the main topic of the articles. Thus, although these popular entities co-occur often with other entities, their relative popularity makes the connection to other entities less definitive.

Equation (1) also includes a weighting factor in the form of the number of unique entities value. The number of unique entities value is the number of unique entities that the compared entity co-occurs with. For example, popular or general entities co-occur with more other entities than less popular or obscure entities. Continuing the example above, if Entity 2 is a popular entity that is included in many articles, it is likely to co-occur with other entities in the matrix 600, such as with Entity 20 and Entity 45. Each such co-occurrence of Entity 2 with another entity is counted and summed to obtain the weighting factor for equation (1). In general, the weighting factor is included to make it more likely that the recommendation score would result in recommending entities that are more popular or included in more articles. This weighing factor operates to prevent obscure entities or those entities that are unlikely to be of interest to a general public being recommended to a particular user, even those interested in a related entity. In one embodiment, the weighing factor is not present and a pure normalized recommendation score is calculated.

The recommendation score is calculated as described above for each possible entity comparison and stored in a database of the system 200. In operation 508, the recommendation scores are sorted by the system 200 to determine a number of top recommendations for each entity of the system. In one embodiment, the system 200 determines the top ten recommendation scores for each entity for inclusion as recommendations, although any number of recommendation scores may be included in the sorted top scores. In one example, each recommendation score for Entity 1 calculated above is sorted from the highest score to the lowest score. Thus, the recommendation score for Entity 1 compared to Entity 2 is sorted with the recommendation score for Entity 1 compared to Entity 3, Entity 1 compared to Entity 4, and so on. From the sorted list, the top ten recommendation scores for Entity 1 compared to each of the other entities are determined.

In operation 510, the system 200 determines the entities a particular user of the reader application is subscribed to or has otherwise selected to receive articles associated with that entity. For example, the particular user selects to receive articles from an article bin related to Entity 1. The selection to subscribe to articles associated with Entity 1 is then provided to the system 200 from the bin such that the system provides the appropriate articles to the user's reader application. In addition to providing the proper articles, the system 200 also determines one or more recommendations of other entities that may interest the user and transmits those recommendations to the user's reader application in operation 512. In one embodiment, the recommendations correspond to the determined top recommendations scores for that entity. Thus, in the above example, the system 200 obtains the top recommendation scores for Entity 1 and provides those entities that, when compared with Entity 1, return the highest recommendation scores. In this manner, the system 200 may provide one or more entity recommendations to the reader application based on an entity selected by the user of the application to follow. To maintain user privacy, when a reader application makes a bin request, the system may also send one or more recommendations for the entity associated with the bin.

Figure 7:
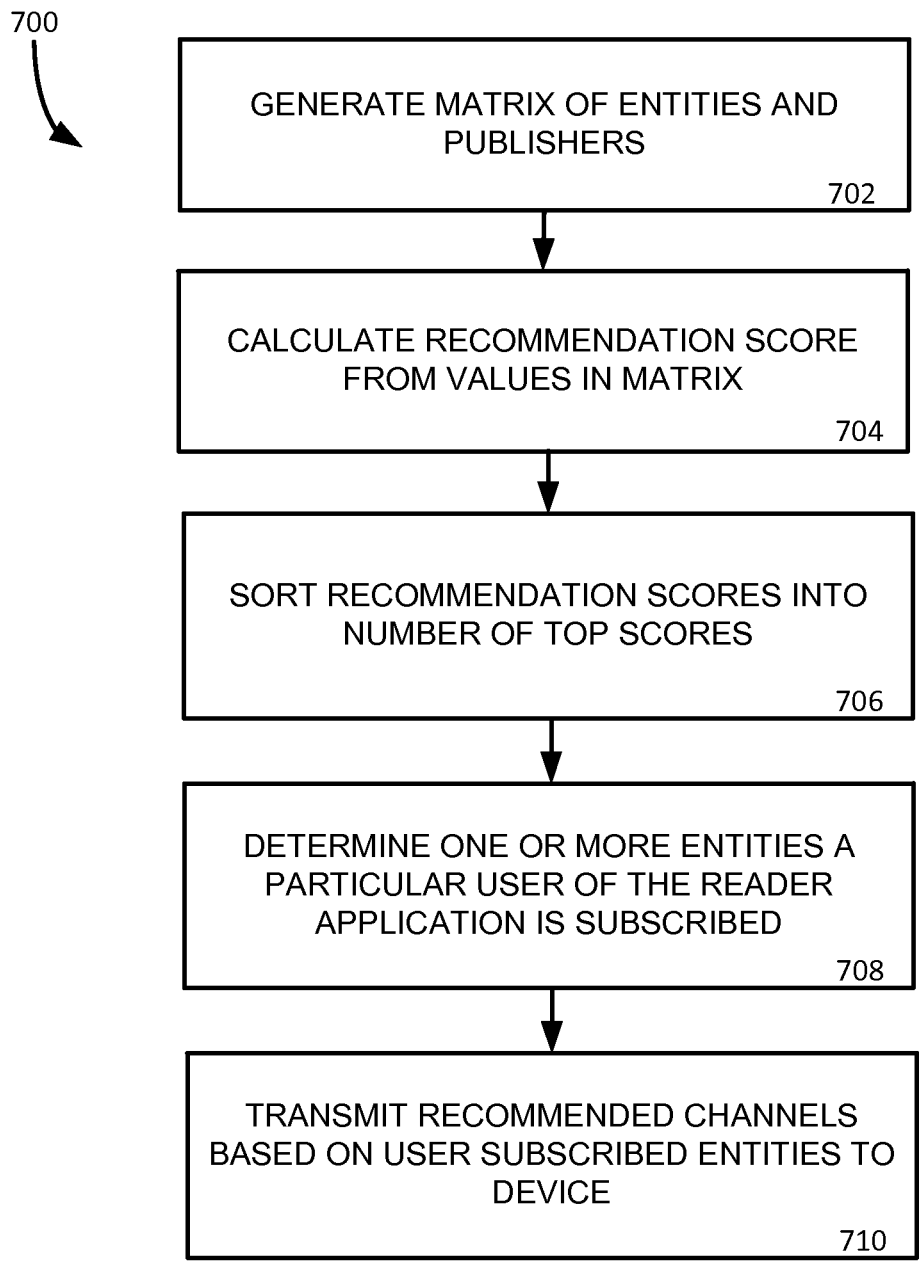
FIG. 7 is a flowchart for a method determining one or more entity recommendations based on a followed channel selected by a user of a reader application.

The system 200 may also provide one or more entity recommendations to a user based on one or more channels or publishers that the user follows. In particular, FIG. 7 is a flowchart for a method determining one or more entity recommendations based on a followed channel as selected by a user of a reader application. As with the method of FIG. 5, the operations of FIG. 7 may be performed by any component of the system 200 or any combination of components, such as the device server 206 and/or device 202.

Figure 8:
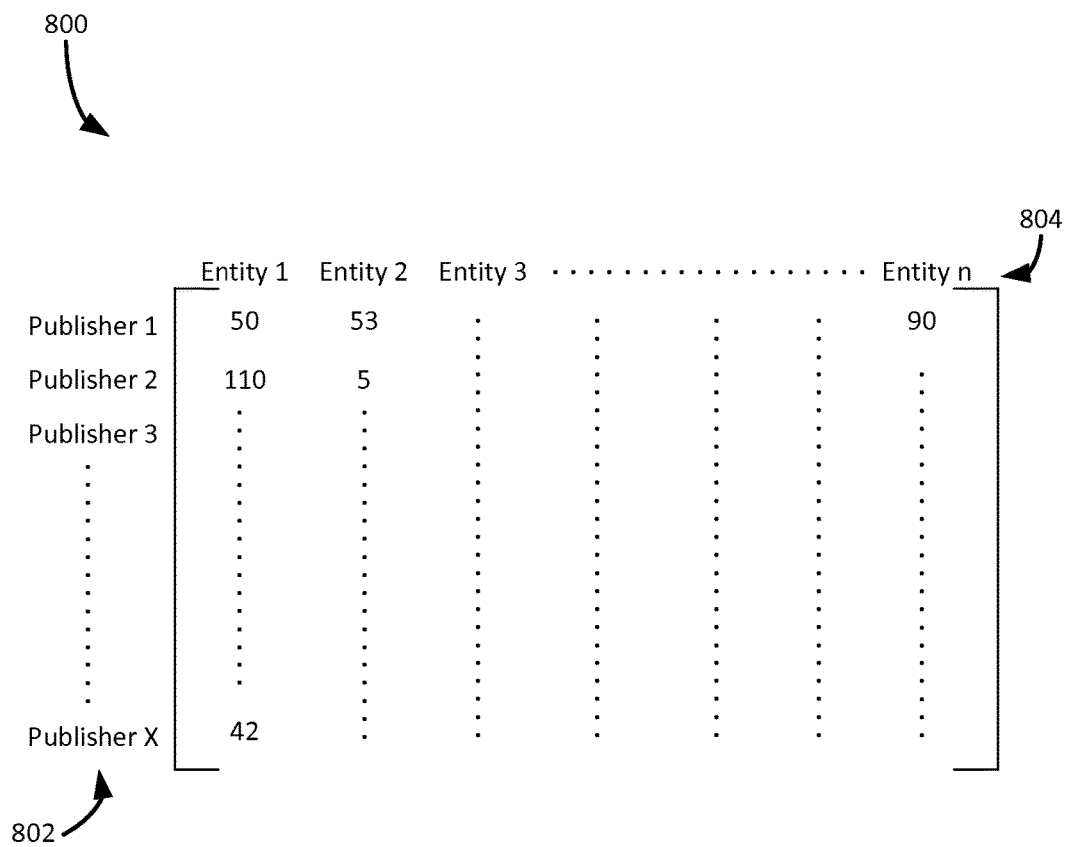
FIG. 8 is one example of a matrix including a selected number of publishers of articles stored in an article database and each of the entities from an entity database.

Beginning in operation 702, the system 200 generates a matrix associating entities maintained in the entity database 214 with any number of publishers of articles stored in the article database 204. As discussed above, the articles in the article database 204 may be published or provided by a recognized publisher to the system 200. FIG. 8 is one example of a matrix 800 including a selected number of publishers of articles from an article database 204 and each of the entities from an entity database 214. Similar to the matrix 600 of FIG. 6, the selected number of publishers included in the matrix 800 ("Publisher 1" through "Publisher X") are shown in a column along the left side of the matrix and the entities ("Entity 1" through "Entity n") are listed along the top side, although other arrangements are possible. Although the number of articles and entities included in the matrix 800 may be any number, in one embodiment each entity stored in the entity database 214 of the system 200 is included in the matrix. Similarly, the number of publishers 802 included in the matrix 800 may vary, such as every publisher of articles stored in the article database 204 or publishers of articles stored in the database over the last 30 days.

Within the matrix 800, a series of columns corresponding to an entity 804 is populated with a count indicating the number of times a particular entity appears in an article provided to the system 200 from a particular publisher. In the example shown in FIG. 8, a "50" count value is located at the cross-section of Entity 1 and Publisher 1 in the matrix 800. This count value indicates that Entity 1 is associated with 50 articles provided by Publisher 1 to the article database 204. Similarly, a "110" count value is located at the cross-section of Entity 1 and Publisher 2 in the matrix 800 indicating that Entity 1 is associated with 110 articles provided by Publisher 2 to the article database 204. A similar column of count values is included in the matrix 800 for Entity 2, Entity 3, and so on to Entity n.

With the Entity-Publisher matrix 800 created, the system 200 calculates recommendation scores from the entries in the matrix for each entity-publisher combination in operation 704. For example, the system calculates a recommendation score for a combination of Entity 1 and Publisher 1. In one particular embodiment, the recommendation score is calculated using the equation:

$$(e_a, pub_b) = \left( \frac{\text{Co-occurence score of } (e_a pub_b)}{\text{Total number of articles for } pub_b} \right) \quad (2)$$

where the co-occurrence score is the score contained in the matrix 800 of FIG. 8 for a cross-section of entity a and publisher b and the total number of articles for publisher b is a sum of all of the count values in the row of the matrix 800 for that particular publisher. For example, the co-occurrence score for the comparison of Entity 1 to Publisher 1 is 50 from the matrix 800 of FIG. 8. The total number of articles for Publisher 1 is the sum of all of the values in the row in the matrix for Publisher 1, namely 50+53+ . . . +90. This value is included in equation (2) to normalize the co-occurrence score relative to the popularity of the entities to appear in the articles from that particular publisher.

In operation 706, the recommendation scores are sorted by the system 200 to determine a number of top recommendations for each entity of the system. For example, each recommendation score for each Entity 1-publisher combination calculated above is sorted from the highest score to the lowest score. Thus, the recommendation score for the Entity 1-Publisher 1 combination is sorted with the recommendation score for the Entity 1-Publisher 2 combination, the Entity 1-Publisher 3 combination, and so on. From the sorted list, the top ten recommendation scores for each entity-publisher combination that includes Entity 1 is determined.

In operation 708 and similar to the operation of FIG. 5, the system 200 determines the entities a particular user of the reader application is subscribed to or has otherwise selected to receive articles associated with that entity. For example, the particular user selects to receive articles related to Entity 1 from a bin associated with Entity 1. The selection to subscribe to article bin associated with Entity 1 is then provided to the system 200 so that the system provides the appropriate articles to the user's reader application. In addition to providing the proper articles, the system 200 also determines one or more recommendations of publishers or channels that may interest the user and transmits those recommendations to the user's reader application in operation 710. In one embodiment, the recommendations correspond to the determined top recommendations scores for that entity. Thus, in the above example, the system 200 obtains the top recommendation scores for Entity 1 and provides those publishers that have the highest recommendation scores in relation to Entity 1. In this manner, the system 200 may provide one or more channel recommendations to the reader application based on an entity selected by the user of the application to follow.

The matrix 800 of FIG. 8 and the method of FIG. 7 may also be utilized by the system 200 to determine an entity recommendation based on a selected channel by the user of the reader application. For example, the system 200 calculates a channel-to-entity recommendation score for each channel in the matrix 800 utilizing the equation:

$$(pub_a, e_b) = \left( \frac{\text{Co-occurence score of } (pub_a e_b)}{\text{Total number of articles for } e_b} \right) \times \text{Number of unique entities of } e_b \quad (3)$$

where the co-occurrence score is the score contained in the matrix 800 of FIG. 8 for a cross-section of publisher a and entity b and the total number of articles for entity b is a sum of all of the count values in the column of the matrix 800 for that particular entity. For example, the co-occurrence score for the comparison of Publisher 1 to Entity 1 is 50 from the matrix 800 of FIG. 8. The total number of articles for Entity 1 is the sum of all of the values in the column in the matrix for Entity 1, namely 50+110+ . . . +42. This value is included in equation (3) to normalize the co-occurrence score relative to the popularity of the entity to appear in articles from all of the publishers included in the matrix 800.

Equation (3) also includes the weighting factor in the form of the number of unique entities value described above in relation to Equation (1). The number of unique entities value is the number of unique entities that the entity co-occurs with. The weighting factor is included to make it more likely that the recommendation score would result in recommending entities that are more popular or included in more articles. This weighing factor operates to prevent obscure entities or those entities that are unlikely to be of interest to a general public, even those interested in a related entity. In one embodiment, the weighing factor is not present and a pure normalized recommendation score is calculated.

Figure 9:
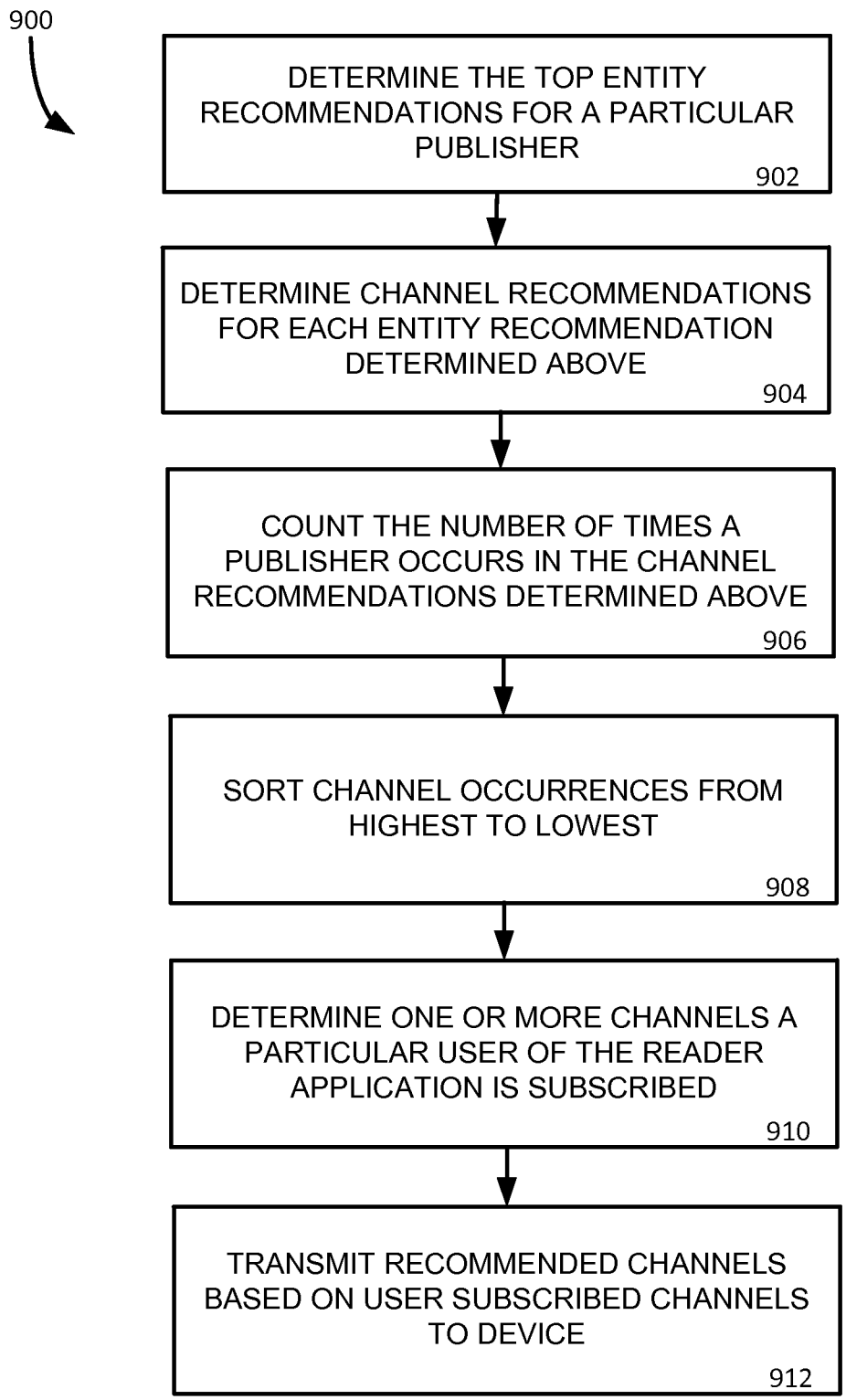
FIG. 9 is a flowchart of a method for determining one or more channel recommendations based on a followed channel selected by a user of a reader application.

Recommendations may also be provided by the system 200 for channels based on a user's subscription to another channel, a channel-channel recommendation. In particular, FIG. 9 is a flowchart of a method for determining one or more channel recommendations based on a followed channel selected by a user of a reader application. As with the method of FIGS. 5 and 7, the operations of FIG. 9 may be performed by any component of the system 200 or any combination of components, such as the device server 206 and/or device 202. The method of FIG. 9 utilizes one or more of the matrices and calculations determined above to obtain one or more channel recommendations to provide to the reader application of the user.

In operation 902, the system 200 determines the top entity recommendations for a particular publisher. For example, the system 200 may receive a channel to which a user of the reader application is subscribed. The system 200 then utilizes the above calculated channel-entity recommendation score for that received channel subscription to determine the top number of entity recommendations. In one example, the number of entity recommendations based on the particular channel may be 10 such recommendations, although any number of top recommendations may be obtained. With the list of recommended entities, the system 200 determines, in operation 904, one or more channel recommendations for each of the determined recommended entities. For example, utilizing the calculations discussed above, each entity may have one or more channels that are recommendations associated with that particular entity. Thus, the system 200 determines which channels are recommended for each of the determined recommended entities and stores the recommended channels in a database or other storage device.

In operation 906, the system 200 counts the number of times each of the recommended channels appears in each list associated with the recommended entities. For example, a user may subscribe to receive articles from a Publisher 1. Based on this information, the system 200 determines several entities with high recommendation scores associated with Publisher 1, such as Entity 1, Entity 20, and Entity 53. With these entities, the system 200 then utilizes the calculations above to determine one or more publishers recommended for each of the determined entities. In one example, the list of recommended publishers may be:

Entity 1→[Publisher 1; Publisher 2; Publisher 3; . . . ]
Entity 20→[Publisher 1; Publisher 4; Publisher 7; . . . ]
Entity 53→[Publisher 1; Publisher 4; Publisher 15; . . . ]

where the publishers associated with each entity are the recommended publishers or channels for the identified entities calculated above.

With the list of recommended publishers determined for each determined entity, the system counts the number of times each of the recommended channels appears in each list associated with the recommended entities. Continuing the above example, Publisher 1 occurs three times in the list, Publisher 2 occurs once in the list, Publisher 4 occurs twice, and so on. In some cases, a publisher in the list may be disregarded by the system 200, such as when the particular publisher that triggered the recommendation determination is included in the list of potential recommended channels. In other words, a recommendation of a particular channel should not be based on a subscription by the user to that particular channel.

In operation 908, the system 200 sorts the publishers included in the list of potential channel recommendations based on the count number associated with that channel. Continuing the example above, the system 200 sorts the list to put Publisher 1 at the top of the list as that publisher appears three times, followed by Publisher 4 and the rest of the publishers in the list. In this manner, the publisher or publishers with the most appearances in the list generated above are sorted to the top of the possible channel recommendations list. The above calculation may be performed for every channel available through the article system 200 to generate a list of recommended channels to provide to a user of the reader application.

In operation 910, the system 200 determines the channels a particular user of the reader application is subscribed to or has otherwise selected. For example, the particular user selects to receive articles related to Publisher 1. The selection to subscribe to articles associated with Publisher 1 is then provided to the system 200 so that the system provides the appropriate articles to the user's reader application. In addition to providing the proper articles, the system 200 also determines one or more recommendations of publishers or channels that may interest the user and transmits those recommendations to the user's reader application in operation 912. In one embodiment, the recommendations correspond to the determined list of top channels associated with the particular channel. In this manner, the system 200 may provide one or more channel recommendations to the reader application based on a selected channel by the user of the application.

The calculations and methods described above may be performed by the system 200 as often as desired by a system administrator. For example, the calculations and matrix generations may occur once per day to consistently update the connections between the entities and the channels. In another example, the calculations and matrix generations may occur once to establish the connections between the entities and the channels. Further, regardless of how often the calculations are performed, the number and type of articles and entities used in the matrices may vary for any reason to tune the recommendation results to a desired recommendation performance.

Figure 10:
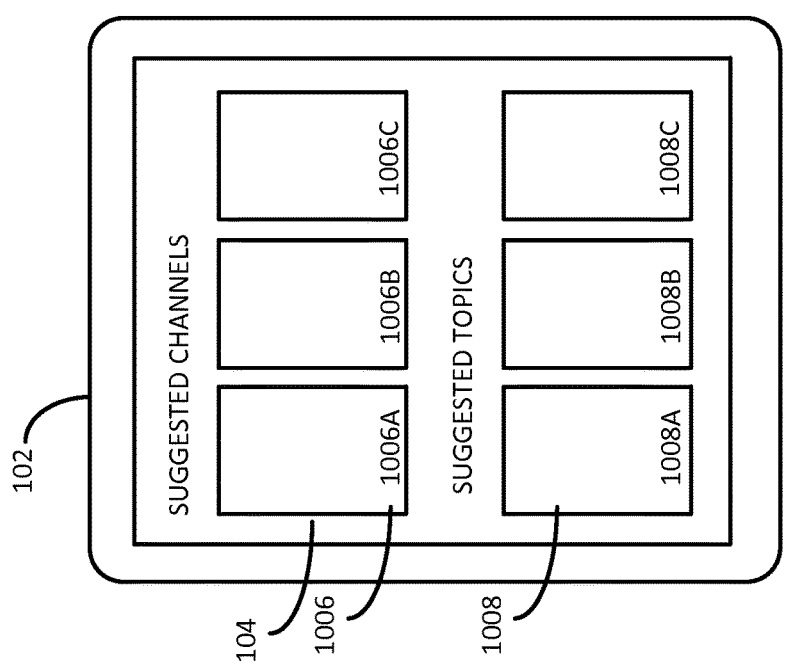
FIG. 10 is a front view of a mobile computing device executing a reader application for displaying one or more recommendations on a user interface.

Through the operations described above, the system 200 may provide one or more recommendations to a reader application to suggest a user subscribe to the recommended channels or topics. FIG. 10 is a front view of a mobile computing device executing a reader application for displaying one or more recommendations on a user interface. The computing device 102 of FIG. 10 is the same or similar device as illustrated and described above in relation to FIG. 1. As such, the computing device 102 executes a reader application 104 that provides the one or more recommendations in a user interface of the application. As shown, the reader application 104 provides a user interface that includes cells, links, or icons representative of recommended channels 1006 and/or recommended entities 1008 or topics. In one embodiment, the reader application 104 includes several icons 1006, 1008, or "cells", that are selectable by a user of the device 102. Channel recommendations 1006 include recommendations for particular publishers while entity recommendations 1008 include recommendations to receive articles related to a particular topic, such as "Entertainment", "Sports", or "Politics". To subscribe to a recommended channel or topic, the user touches the respective cell 1006, 1008 to launch or otherwise access the article represented by the cell. In this manner, the recommendations provided by the system 200 to a reader application 104 may be subscribed to by a user of the application.

As should be appreciated, a device 202 may receive several recommendations for entities or channels. Thus, in some instances, not every recommendation may be shown in the user interface of the reader application. In one implementation, the device 202 may analyze the recommendations received from the system 200 to determine the entity or channel with the highest number of recommendations. For example, the device 202 may receive 50 recommended channels and entities based on the subscriptions of the reader application. Of those 50 recommendations, the same channel or entity may appear several times. Such as, if a reader application subscribes to the entity "football", "baseball", and "basketball", the system 200 may return a recommendation for the reader application to subscribe to the entity "sports" for each of the three subscriptions (based on the methods described above). The device 202 may, in turn, recognize that the entity "sports" has been recommended to the reader application three times and elevate or up-weighting that recommendation in the list of possible recommendations for the reader application. Elevating the recommendation may ensure that the recommendation appears in the user's recommendations in the user interface of the reader application. In this and similar manners, the device 202 may analyze the received recommendations and sort and/or combine recommendations to enhance the user's experience with the reader application.

As described above, the device 202 may monitor the usage of a reader application, such as the time of day an article is accessed and the length of time the article is viewed. In one implementation, the device 202 may analyze a click-through rate for entities associated with articles and use the click-through rate to request recommendations from the system 200. For example, the device 202 may determine an average click-through rate for a user for all entities of received articles. With the average click-through rate determined, the device 202 may further monitor to detect is a particular entity or group of entities has a higher click-through rate by the user of the reader application. When an entity or entities with a higher click-through rate is detected for an entity to which the reader application is not subscribed, the device 202 may create a recommendation for that entity in the reader application's list of recommendations. In another implementation, the device 202 may not compare the click-through rate for an entity to an average click-through rate, but may rather provide a recommendation for those entities with a click-through rate that exceeds a particular threshold value. The device 202 may also consider the time of day an article is accessed and the length of time a user engages with an article associated with the entities when determining recommendations. Similar to above, such information may be maintained by the client device 202 such that no identifying information is provided to the system 200 and the user privacy is preserved.

Figure 11:
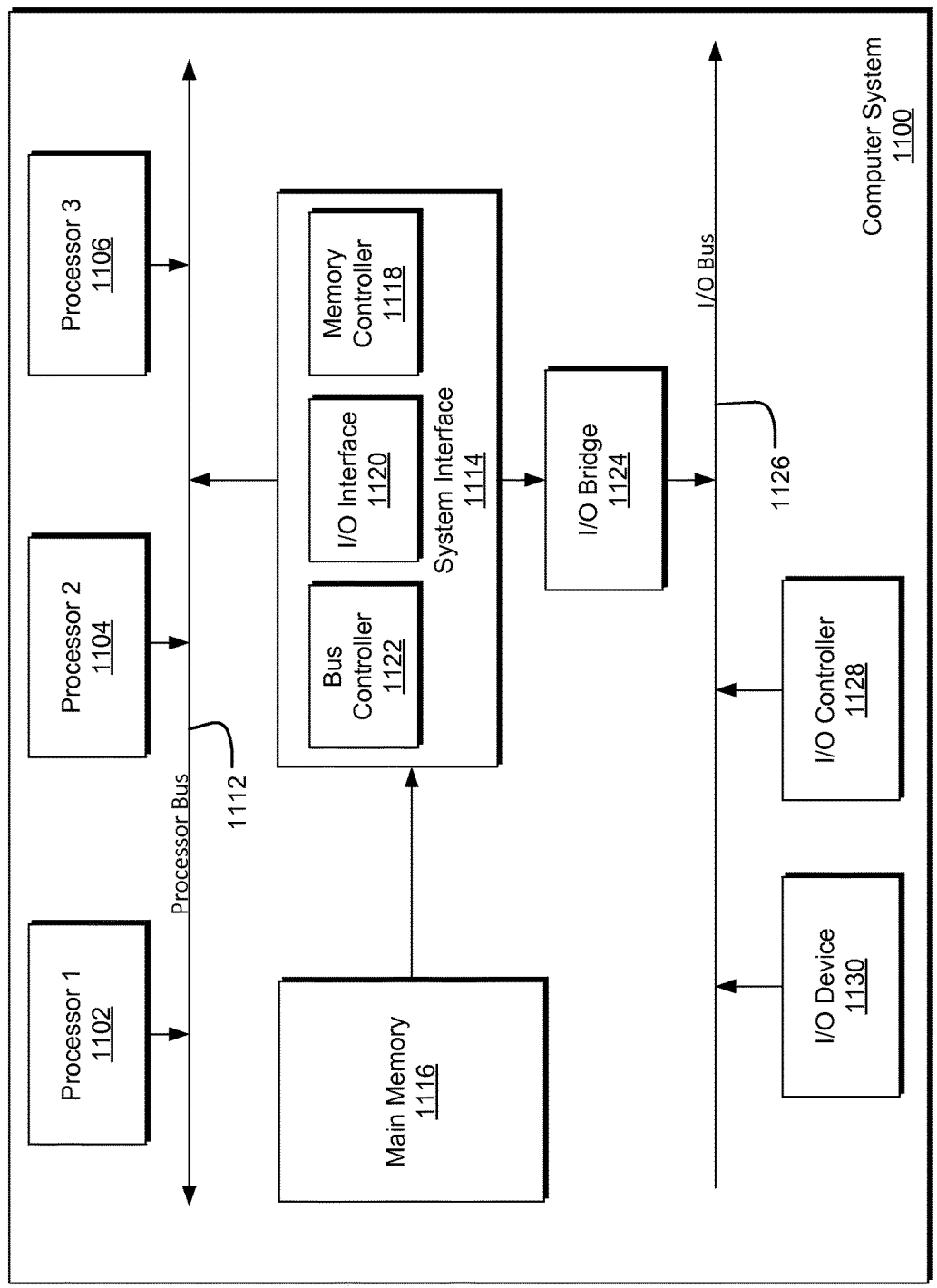
FIG. 11 is an example computing system that may implement various systems and methods discussed herein.

FIG. 11 is a block diagram illustrating an example of a computing device or computer system 1100 which may be used in implementing the embodiments of the present disclosure. For example, the computing system 1100 of FIG. 11 may be a portion of the device 202 or device server 206 of the system 200. The computer system includes one or more processors 1102-1106. Processors 1102-1106 may include one or more internal levels of cache (not shown) and a bus controller or bus interface unit to direct interaction with the processor bus 1112. Processor bus 1112, also known as the host bus or the front side bus, may be used to couple the processors 1102-1106 with the computer system interface 1114. Computer system interface 1114 may be connected to the processor bus 1112 to interface other components of the computer system 1100 with the processor bus 1112. For example, computer system interface 1114 may include a memory controller 1113 for interfacing a main memory 1116 with the processor bus 1112. The main memory 1116 typically includes one or more memory cards and a control circuit (not shown). Computer system interface 1114 may also include an input/output (I/O) interface 1120 to interface one or more I/O bridges or I/O devices with the processor bus 1112. One or more I/O controllers and/or I/O devices may be connected with the I/O bus 1126, such as I/O controller 1128 and I/O device 1130, as illustrated.

I/O device 1130 may also include an input device (not shown), such as an alphanumeric input device, including alphanumeric and other keys for communicating information and/or command selections to the processors 1102-1106. Another type of user input device includes cursor control, such as a mouse, a trackball, or cursor direction keys for communicating direction information and command selections to the processors 1102-1106 and for controlling cursor movement on the display device.

Computer system 1100 may include a dynamic storage device, referred to as main memory 1116, or a random access memory (RAM) or other computer-readable devices coupled to the processor bus 1112 for storing information and instructions to be executed by the processors 1102-1106. Main memory 1116 also may be used for storing temporary variables or other intermediate information during execution of instructions by the processors 1102-1106. System 1100 may include a read only memory (ROM) and/or other static storage device coupled to the processor bus 1112 for storing static information and instructions for the processors 1102-1106. The system set forth in FIG. 11 is but one possible example of a computer system that may employ or be configured in accordance with aspects of the present disclosure.

According to one embodiment, the above techniques may be performed by computer system 1100 in response to processor 1104 executing one or more sequences of one or more instructions contained in main memory 1116. These instructions may be read into main memory 1116 from another machine-readable medium, such as a storage device. Execution of the sequences of instructions contained in main memory 1116 may cause processors 1102-1106 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 1116. Common forms of machine-readable medium may include, but is not limited to, magnetic storage medium; optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Figure 12:
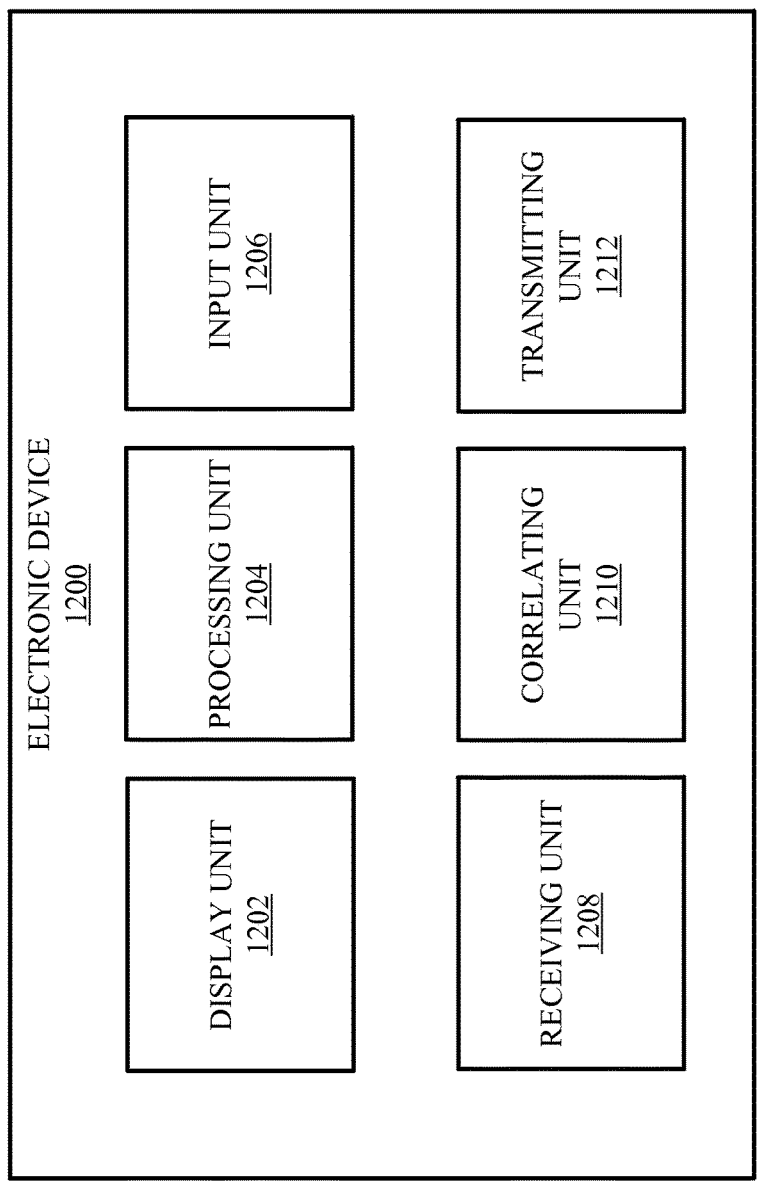
FIG. 12 is a functional block diagram of an electronic device including operational units arranged to perform various operations of a reader application.

FIG. 12 is a functional block diagram of an electronic device including operational units arranged to perform various operations of a reader application. The operational units 1202-1212 of the device 1200 are implemented by hardware or a combination of hardware and software to carry out the principles of the present disclosure. It will be understood by persons of skill in the art that the operational units 1202-1212 described in FIG. 12 may be combined or separated into sub-blocks to implement the principles of the present disclosure. Therefore, the description herein supports any possible combination or separation or further definition of the operational units 1202-1212.

In one implementation, the electronic device 1200 includes a display unit 1202 configured to display information, such as a graphical user interface, and a processing unit 1204 in communication with the display unit 802 and an input unit 1206 configured to receive data from one or more input devices or systems. Various operations described herein may be implemented by the processing unit 1204 using data received by the input unit 1206 to output information for display using the display unit 1202. Further, one or more of the units of the device 1200 may be included in the computer system 1100 described above.

Additionally, in one implementation, the electronic device 1200 includes units implementing the operations described herein. For example, a receiving unit 1208 may receive, from the computing device, an indication of an interest by a user of the computing device in a first parameter of a first subset of a plurality of article-type computing files available from a computer file providing system. A correlating unit 1210 may receive, from the computing device, an indication of an interest by a user of the computing device in a first parameter of a first subset of a plurality of article-type computing files available from a computer file providing system and correlate the first parameter of the first subset of the plurality of article-type computing files to a second parameter of a second subset of the plurality of article-type computing files available from a computer file providing system, the first parameter different than the second parameter. The processing unit 1204 may calculate a recommendation for one or more articles of the plurality of article-type computing files available from a computer file providing system based at least on the correlation of the first parameter and the second parameter. A transmitting unit 1212 may transmit a recommendation indicator to the computing device for the one or more articles of the plurality of article-type computing files available from the computer file providing system.

Embodiments of the present disclosure include various operations or steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

While the present disclosure has been described with reference to various implementations, it will be understood that these implementations are illustrative and that the scope of the disclosure is not limited to them. Many variations, modifications, additions, and improvements are possible. More generally, implementations in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method for providing a computer file to a computing device, the method comprising:
   receiving, from the computing device, an indication of an interest by a user of the computing device in a first parameter of a first subset of a plurality of article-type computing files available from a computer file providing system;
   correlating the first parameter of the first subset of the plurality of article-type computing files to a plurality of second parameters of a group of the plurality of article-type computing files available from a computer file providing system based upon a co-occurrence of the first parameter and the second parameter with respect to the plurality of article-type computing files, the first parameter different than the plurality of second parameters;
   identifying co-occurrence scores by counting co-occurrence between the first parameter and each of the plurality of second parameters based upon the correlation;
   calculating a parameter-to-parameter recommendation score using the co-occurrence scores;
   calculating a recommendation for one or more articles of the plurality of article-type computing files available from a computer file providing system that are associated with at least a particular one of the plurality of second parameters, the particular one of the plurality of second parameters selected based upon the parameter-to-parameter recommendation score; and
   transmitting an indication of the recommendation to the computing device for the one or more articles of the plurality of article-type computing files available from the computer file providing system.

2. The method of claim 1, wherein the first parameter is a first topic associated with the first subset of the plurality of article-type computing files and the plurality of second parameters is a second topic associated with the group of the plurality of article-type computing files.

3. The method of claim 2 wherein correlating the first parameter of the first subset to the plurality of second parameters comprises:
   generating a matrix of a plurality of topics and the plurality of article-type computing files, the plurality of article-type computing files stored in a central database accessible by the computer file providing system; and
   calculating a recommendation score for each of the plurality of topics to each other of the plurality of topics.

4. The method of claim 3 wherein the recommendation for the one or more articles of the plurality of article-type computing files is based at least on the calculated recommendation score for each of the plurality of topics to each other of the plurality of topics.

5. The method of claim 1, wherein the first parameter is a topic associated with the first subset of the plurality of article-type computing files and the plurality of second parameters is a publishing entity associated with the group of the plurality of article-type computing files.

6. The method of claim 5, wherein correlating the first parameter to the plurality of second parameters comprises:
   generating a matrix of a plurality of topics and a plurality of publishing entities associated with the plurality of article-type computing files, the plurality of article-type computing files stored in a central database accessible by the computer file providing system; and
   calculating a recommendation score for each of the plurality of topics to each of the plurality of publishing entities.

7. The method of claim 6 wherein the recommendation for the one or more articles of the plurality of article-type computing files is based at least on the calculated recommendation score for each of the plurality of topics to each of the plurality of publishing entities.

8. The method of claim 1, wherein the first parameter is a first publishing entity associated with the first subset of the plurality of article-type computing files and the plurality of second parameters is a second publishing entity associated with the group of the plurality of article-type computing files.

9. The method of claim 8 wherein correlating the first parameter to the plurality of second parameters comprises:
   generating a matrix of a plurality of topics and a plurality of publishing entities associated with the plurality article-type computing files, the plurality of article-type computing files stored in a central database accessible by the computer file providing system; and
   determining a common topic between the first publishing entity and the second publishing entity.

10. The method of claim 9 wherein the recommendation for the one or more articles of the plurality of article-type computing files is based at least on the presence of the common topic between the first publishing entity and the second publishing entity.

11. A system for file sharing, the system comprising:
    a file database storing a plurality of article-type computing files; and
    a computing device in communication with the file database, the computing device comprising:
       at least one processor;
       at least one communication port for communication with the file database and a user device;

a tangible computer-readable medium with one or more executable instructions stored thereon, wherein the at least one processor executes the one or more instructions to perform the operations of:

receiving, from the user device, an indication of an interest by a user of the user device in a first parameter of a first subset of the plurality of article-type computing files;

correlating the first parameter of the first subset of the plurality of article-type computing files to a plurality of second parameters of at least a subset of the plurality of article-type computing files based upon a co-occurrence of the first parameter and the second parameter with respect to the plurality of article-type computing files, the first parameter different than the plurality of second parameters;

identifying co-occurrence scores by counting co-occurrence between the first parameter and each of the plurality of second parameters based upon the correlation;

calculating a parameter-to-parameter recommendation score using the co-occurrence scores;

calculating a recommendation for one or more articles of the plurality of article-type computing files in the file database that are associated with at least a particular one of the plurality of second parameters, the particular one of the plurality of second parameters selected based upon the parameter-to-parameter recommendation score; and transmitting an indication of the recommendation to the user device for the one or more articles of the plurality of article-type computing files.

12. The system of claim 11 wherein the first parameter is a first topic associated with the first subset of the plurality of article-type computing files and the plurality of second parameters is a second topic associated with at least the subset of the plurality of article-type computing files.

13. The system of claim 12 wherein correlating the first parameter to the plurality of second parameters comprises:

generating a matrix of a plurality of topics and the plurality of article-type computing files, the plurality of article-type computing files stored in a central database accessible by the computer file providing system; and calculating a recommendation score for each of the plurality of topics to each other of the plurality of topics.

14. The system of claim 13 wherein the recommendation for the one or more articles of the plurality of article-type computing files is based at least on the calculated recommendation score for each of the plurality of topics to each other of the plurality of topics.

15. The system of claim 11, wherein the first parameter is a topic associated with the first subset of the plurality of article-type computing files and the plurality of second parameters is a publishing entity associated with the at least the subset of the plurality of article-type computing files.

16. The system of claim 15 wherein correlating the first parameter to the plurality of second parameters comprises:

generating a matrix of a plurality of topics and a plurality of publishing entities associated with the plurality of article-type computing files, the plurality of article-type computing files stored in a central database accessible by the computer file providing system; and calculating a recommendation score for each of the plurality of topics to each of the plurality of publishing entities.

17. The system of claim 16 wherein the recommendation for the one or more articles of the plurality of article-type computing files is based at least on the calculated recommendation score for each of the plurality of topics to each of the plurality of publishing entities.

18. The system of claim 11 wherein the one or more executable instructions further cause the at least one processor to perform the operations of:

receiving a selection of the indication of the recommendation by the user of the user device; and transmitting the one or more articles of the plurality of article-type computing files to the user device.

19. A non-transitory computer-readable medium storing one or more executable instructions to perform a computer-implemented method, the one or more executable instructions to:

receive, from a computing device, an indication of an interest by a user of the computing device in a first parameter of a first subset of a plurality of article-type computing files available from a computer file providing system;

correlate the first parameter of the first subset of the plurality of article-type computing files to a plurality of second parameters of at least a subset of the plurality of article-type computing files available from a computer file providing system based upon a co-occurrence of the first parameter and the second parameter with respect to the plurality of article-type computing files, the first parameter different than the plurality of second parameters;

identify co-occurrence scores by counting co-occurrence between the first parameter and each of the plurality of second parameters based upon the correlation;

calculate a parameter-to-parameter recommendation score using the co-occurrence scores;

calculate a recommendation for one or more articles of the plurality of article-type computing files available from a computer file providing system that are associated with at least a particular one of the plurality of second parameters, the particular one of the plurality of second parameters selected based upon the parameter-to-parameter recommendation score; and transmit, from a device server, an indication of the recommendation indicator to the computing device for the one or more articles of the plurality of article-type computing files available from the computer file providing system.

20. The non-transitory computer-readable medium of claim 19 wherein the computer-implemented method further comprises:

receiving a selection of the indication of the recommendation from the computing device; and transmitting the one or more articles of the plurality of article-type computing files to the computing device.

* * * * *